US011567996B2

(12) United States Patent
Rao et al.

(10) Patent No.: US 11,567,996 B2
(45) Date of Patent: Jan. 31, 2023

(54) COLLABORATIVE DOCUMENT GRAPH-BASED USER INTERFACES

(71) Applicants: Atlassian PTY Ltd, Sydney (AU); Atlassian, Inc., San Francisco, CA (US)

(72) Inventors: Shashank Prasad Rao, Bengaluru (IN); Bharat Agarwal, Gurgaon (IN); Avinash Agrawal, Bangalore (IN); Viraj Sinha, Noida (IN)

(73) Assignees: ATLASSIAN PTY LTD, Sydney (AU); ATLASSIAN, INC., San Francisco, CA (US)

(*) Notice: Subject to any disclaimer, the term of this patent is extended or adjusted under 35 U.S.C. 154(b) by 74 days.

(21) Appl. No.: 17/134,998

(22) Filed: Dec. 28, 2020

(65) Prior Publication Data
US 2022/0207086 A1 Jun. 30, 2022

(51) Int. Cl.
*G06F 9/451* (2018.01)
*G06F 16/901* (2019.01)
(Continued)

(52) U.S. Cl.
CPC .......... *G06F 16/9024* (2019.01); *G06F 9/451* (2018.02); *G06F 16/176* (2019.01);
(Continued)

(58) Field of Classification Search
CPC .... G06F 16/9024; G06F 9/451; G06F 16/176; G06F 16/4393; G06Q 10/10; G06Q 10/103; H04L 65/4015
See application file for complete search history.

(56) References Cited

U.S. PATENT DOCUMENTS 5,999,192 A * 12/1999 Selfridge ................ G06F 16/26
345/440
6,594,673 B1 * 7/2003 Smith ..................... G06F 16/954
(Continued)

OTHER PUBLICATIONS

Miners, J. "Using Graphviz in Confluence—A Tutorial." Sep. 28, 2012. https://web.archive.org/web/20160422023453/https://thedetaildept.com/2012/09/28/using-graphviz-in-confluence-a-tutorial/ (Year: 2012).*
(Continued)

*Primary Examiner* — Kieu D Vu
*Assistant Examiner* — Alvaro R Calderon, IV
(74) *Attorney, Agent, or Firm* — Alston & Bird LLP

(57) ABSTRACT

Various embodiments of the present invention provide methods, apparatuses, systems, computing devices, and/or the like that are configured to enable effective and efficient aggregate user-document interaction monitoring in collaborative document server systems. For example, certain embodiments of the present invention provide methods, apparatuses, systems, computing devices, and/or the like that are configured to perform aggregate user-document interaction monitoring in collaborative document server systems using one or more of collaborative document graph-based user interfaces, collaborative document graph-based interface objects, edge-wise visual effect objects, collaborative document node objects, collaborative document node elements, document transition edge objects, and document transition edge elements.

19 Claims, 14 Drawing Sheets

(51) Int. Cl.
*G06F 16/438* (2019.01)
*H04L 65/401* (2022.01)
*G06F 16/176* (2019.01)
*G06Q 10/10* (2012.01)

(52) U.S. Cl.
CPC ......... *G06F 16/4393* (2019.01); *G06Q 10/10* (2013.01); *G06Q 10/103* (2013.01); *H04L 65/4015* (2013.01)

(56) References Cited

U.S. PATENT DOCUMENTS

| | | | | |
|---|---|---|---|---|
| 7,539,697 | B1 * | 5/2009 | Akella | H04L 51/32 707/999.102 |
| 9,172,621 | B1 * | 10/2015 | Dippenaar | H04L 41/0879 |
| 2002/0002571 | A1 * | 1/2002 | Manohar | G06F 16/954 715/273 |
| 2002/0083170 | A1 * | 6/2002 | Collazo | H04L 41/142 700/226 |
| 2003/0120639 | A1 * | 6/2003 | Potok | G06F 16/353 |
| 2003/0182310 | A1 * | 9/2003 | Charnock | G06Q 10/10 |
| 2004/0059436 | A1 * | 3/2004 | Anderson | G06F 11/3447 700/2 |
| 2008/0270458 | A1 * | 10/2008 | Gvelesiani | G06F 16/288 |
| 2011/0138292 | A1 * | 6/2011 | Falkenberg | G06Q 10/10 715/738 |
| 2013/0013667 | A1 * | 1/2013 | Serena | G06F 21/10 709/203 |
| 2013/0080457 | A1 * | 3/2013 | Narayanan | H04W 4/023 707/758 |
| 2013/0254699 | A1 * | 9/2013 | Bashir | G06Q 10/10 715/772 |
| 2013/0282889 | A1 * | 10/2013 | Tito | H04L 41/12 709/224 |
| 2013/0293551 | A1 * | 11/2013 | Erez | G06T 11/206 345/440 |
| 2014/0019533 | A1 * | 1/2014 | Sherman | G06Q 50/01 709/204 |
| 2014/0129936 | A1 * | 5/2014 | Richards | H04L 63/101 715/716 |
| 2014/0298207 | A1 * | 10/2014 | Ittah | G06Q 10/00 715/753 |
| 2014/0304407 | A1 * | 10/2014 | Moon | H04L 61/6063 709/224 |
| 2015/0188768 | A1 * | 7/2015 | Maini | H04L 47/41 709/224 |
| 2015/0222730 | A1 * | 8/2015 | Gower | H04L 67/42 709/203 |
| 2015/0358391 | A1 * | 12/2015 | Moon | G06F 11/3006 709/224 |
| 2015/0379887 | A1 * | 12/2015 | Becker | G06F 16/93 715/229 |
| 2017/0098009 | A1 * | 4/2017 | Srinivasan | G06F 16/9024 |
| 2017/0185592 | A1 * | 6/2017 | Frei | G06F 16/41 |
| 2017/0277769 | A1 * | 9/2017 | Pasupathy | G06F 16/285 |
| 2017/0309047 | A1 * | 10/2017 | Demiralp | G06F 16/958 |
| 2018/0173372 | A1 * | 6/2018 | Greenspan | G06T 11/206 |
| 2018/0174060 | A1 * | 6/2018 | Velez-Rojas | G06N 5/02 |
| 2018/0359219 | A1 * | 12/2018 | Israel | H04L 63/0272 |
| 2018/0365626 | A1 * | 12/2018 | Mansour | G06Q 10/063118 |
| 2018/0365627 | A1 * | 12/2018 | Mansour | G06Q 10/06393 |
| 2019/0116504 | A1 * | 4/2019 | Rusackas | H04L 41/22 |
| 2019/0188332 | A1 * | 6/2019 | Ingvaldsen | G06F 16/9024 |
| 2019/0303838 | A1 * | 10/2019 | Chung | G06F 16/288 |
| 2020/0134243 | A1 * | 4/2020 | Vardi | G06F 30/13 |
| 2021/0074039 | A1 * | 3/2021 | Kholodkov | G06T 11/206 |
| 2021/0133241 | A1 * | 5/2021 | Xu | G06F 3/04847 |

OTHER PUBLICATIONS

Enisra. "Issue Graph." captured on Aug. 15, 2020. https://web.archive.org/web/20200815113938/https://marketplace.atlassian.com/apps/1213005/issue-graph?tab=overview&hosting=server (Year: 2020).*

Gansner et al. "Drawing graphs with dot." Jan. 5, 2015. https://web.archive.org/web/20150218152539/https://graphviz.org/pdf/dotguide.pdf (Year: 2015).*

Baudisch et al. "Phosphor: explaining transitions in the user interface using afterglow effects." Oct. 15, 2006. In Proceedings of the 19th annual ACM symposium on User interface software and technology (UIST '06). https://doi.org/10.1145/1166253.1166280 (Year: 2006).*

* cited by examiner

COLLABORATIVE DOCUMENT GRAPH-BASED USER INTERFACES

BACKGROUND

Various methods, apparatuses, and systems are configured to provide techniques for aggregate user-document interaction monitoring in collaborative document server systems. Applicant has identified many deficiencies and problems associated with existing methods, apparatuses, and systems for aggregate user-document interaction monitoring in collaborative document server systems. Through applied effort, ingenuity, and innovation, these identified deficiencies and problems have been solved by developing solutions that are in accordance with the embodiments of the present invention, many examples of which are described in detail herein.

BRIEF SUMMARY

In general, embodiments of the present invention provide methods, apparatuses, systems, computing devices, and/or the like that are configured to enable effective and efficient aggregate user-document interaction monitoring in collaborative document server systems. For example, certain embodiments of the present invention provide methods, apparatuses, systems, computing devices, and/or the like that are configured to perform aggregate user-document interaction monitoring in collaborative document server systems using one or more of collaborative document graph-based user interfaces, collaborative document graph-based interface objects, edge-wise visual effect objects, collaborative document node objects, collaborative document node elements, document transition edge objects, and document transition edge elements.

In accordance with one aspect, a computer-implemented method is provided. In one embodiment, the computer-implemented method comprises: presenting, via a display, a collaborative document graph-based user interface comprising a plurality of collaborative document node elements that are visually connected, at least partly, by a plurality of document transition edge elements, wherein the plurality of document transition edge elements are configured to visually represent collaborative document user transition data; determining, via a processor, an edge-wise visual effect associated with a selected document transition edge element of the plurality of document transition edge elements, wherein the selected document transition edge element is defined between a first collaborative document node element of the plurality of collaborative document node elements and a second collaborative document node element of the plurality of collaborative document node elements, and wherein the edge-wise visual effect is determined based on an edge-wise visual effect object, and further wherein the edge-wise visual effect object is determined based on a subset of the collaborative document user transition data that is associated with a first collaborative document node object corresponding to the first collaborative document node element and a second collaborative document node object corresponding to the second collaborative document node element; and updating the collaborative document graph-based user interface to apply the edge-wise visual effect to the selected document transition edge element.

In accordance with another aspect, a computer program product is provided. The computer program product may comprise at least one computer-readable storage medium having computer-readable program code portions stored therein, the computer-readable program code portions comprising executable portions configured to: present, via a display, a collaborative document graph-based user interface comprising a plurality of collaborative document node elements that are visually connected, at least partly, by a plurality of document transition edge elements, wherein the plurality of document transition edge elements are configured to visually represent collaborative document user transition data; determine, via a processor, an edge-wise visual effect associated with a selected document transition edge element of the plurality of document transition edge elements, wherein the selected document transition edge element is defined between a first collaborative document node element of the plurality of collaborative document node elements and a second collaborative document node element of the plurality of collaborative document node elements, and wherein the edge-wise visual effect is determined based on an edge-wise visual effect object, and further wherein the edge-wise visual effect object is determined based on a subset of the collaborative document user transition data that is associated with a first collaborative document node object corresponding to the first collaborative document node element and a second collaborative document node object corresponding to the second collaborative document node element; and update the collaborative document graph-based user interface to apply the edge-wise visual effect to the selected document transition edge element.

In accordance with yet another aspect, an apparatus comprising at least one processor and at least one memory including computer program code is provided. In one embodiment, the at least one memory and the computer program code may be configured to, with the processor, cause the apparatus to: present, via a display, a collaborative document graph-based user interface comprising a plurality of collaborative document node elements that are visually connected, at least partly, by a plurality of document transition edge elements, wherein the plurality of document transition edge elements are configured to visually represent collaborative document user transition data; determine, via a processor, an edge-wise visual effect associated with a selected document transition edge element of the plurality of document transition edge elements, wherein the selected document transition edge element is defined between a first collaborative document node element of the plurality of collaborative document node elements and a second collaborative document node element of the plurality of collaborative document node elements, and wherein the edge-wise visual effect is determined based on an edge-wise visual effect object, and further wherein the edge-wise visual effect object is determined based on a subset of the collaborative document user transition data that is associated with a first collaborative document node object corresponding to the first collaborative document node element and a second collaborative document node object corresponding to the second collaborative document node element; and update the collaborative document graph-based user interface to apply the edge-wise visual effect to the selected document transition edge element.

In accordance with another aspect, a computer-implemented method is provided. In one embodiment, the computer-implemented method comprises: generating a collaborative document graph-based interface object that describes the collaborative document graph-based user interface, wherein the collaborative document graph-based user interface comprising a plurality of collaborative document node elements that are visually connected, at least partly, by a plurality of document transition edge elements, wherein the plurality of document transition edge elements are configured to visually represent collaborative document user transition data; transmitting the collaborative document graph-based interface object to a client computing device to cause the client computing device to present the collaborative document graph-based user interface based on the collaborative document graph-based interface object; determining an edge-wise visual effect object associated with a selected document transition edge object that is associated with a selected document transition element of the plurality of document transition elements, wherein the selected document transition edge element is defined between a first collaborative document node element of the plurality of collaborative document node elements and a second collaborative document node element of the plurality of collaborative document node elements, and wherein the edge-wise visual effect object is determined based on a subset of the collaborative document user transition data that is associated with a first collaborative document node object corresponding to the first collaborative document node element and a second collaborative document node object corresponding to the second collaborative document node element; and transmitting the edge-wise visual effect object to the client computing device, wherein the client computing device is configured to update the collaborative document graph-based user interface to apply an edge-wise visual effect corresponding to the edge-wise visual effect object to the selected document transition edge element.

In accordance with another aspect, a computer program product is provided. The computer program product may comprise at least one computer-readable storage medium having computer-readable program code portions stored therein, the computer-readable program code portions comprising executable portions configured to: generate a collaborative document graph-based interface object that describes the collaborative document graph-based user interface, wherein the collaborative document graph-based user interface comprising a plurality of collaborative document node elements that are visually connected, at least partly, by a plurality of document transition edge elements, wherein the plurality of document transition edge elements are configured to visually represent collaborative document user transition data; transmit the collaborative document graph-based interface object to a client computing device to cause the client computing device to present the collaborative document graph-based user interface based on the collaborative document graph-based interface object; determine an edge-wise visual effect object associated with a selected document transition edge object that is associated with a selected document transition element of the plurality of document transition elements, wherein the selected document transition edge element is defined between a first collaborative document node element of the plurality of collaborative document node elements and a second collaborative document node element of the plurality of collaborative document node elements, and wherein the edge-wise visual effect object is determined based on a subset of the collaborative document user transition data that is associated with a first collaborative document node object corresponding to the first collaborative document node element and a second collaborative document node object corresponding to the second collaborative document node element; and transmit the edge-wise visual effect object to the client computing device, wherein the client computing device is configured to update the collaborative document graph-based user interface to apply an edge-wise visual effect corresponding to the edge-wise visual effect object to the selected document transition edge element.

In accordance with yet another aspect, an apparatus comprising at least one processor and at least one memory including computer program code is provided. In one embodiment, the at least one memory and the computer program code may be configured to, with the processor, cause the apparatus to: generate a collaborative document graph-based interface object that describes the collaborative document graph-based user interface, wherein the collaborative document graph-based user interface comprising a plurality of collaborative document node elements that are visually connected, at least partly, by a plurality of document transition edge elements, wherein the plurality of document transition edge elements are configured to visually represent collaborative document user transition data; transmit the collaborative document graph-based interface object to a client computing device to cause the client computing device to present the collaborative document graph-based user interface based on the collaborative document graph-based interface object; determine an edge-wise visual effect object associated with a selected document transition edge object that is associated with a selected document transition element of the plurality of document transition elements, wherein the selected document transition edge element is defined between a first collaborative document node element of the plurality of collaborative document node elements and a second collaborative document node element of the plurality of collaborative document node elements, and wherein the edge-wise visual effect object is determined based on a subset of the collaborative document user transition data that is associated with a first collaborative document node object corresponding to the first collaborative document node element and a second collaborative document node object corresponding to the second collaborative document node element; and transmit the edge-wise visual effect object to the client computing device, wherein the client computing device is configured to update the collaborative document graph-based user interface to apply an edge-wise visual effect corresponding to the edge-wise visual effect object to the selected document transition edge element.

BRIEF DESCRIPTION OF THE SEVERAL VIEW OF THE DRAWINGS

Having thus described some embodiments in general terms, references will now be made to the accompanying drawings, which are not drawn to scale, and wherein:

Figure 7A:
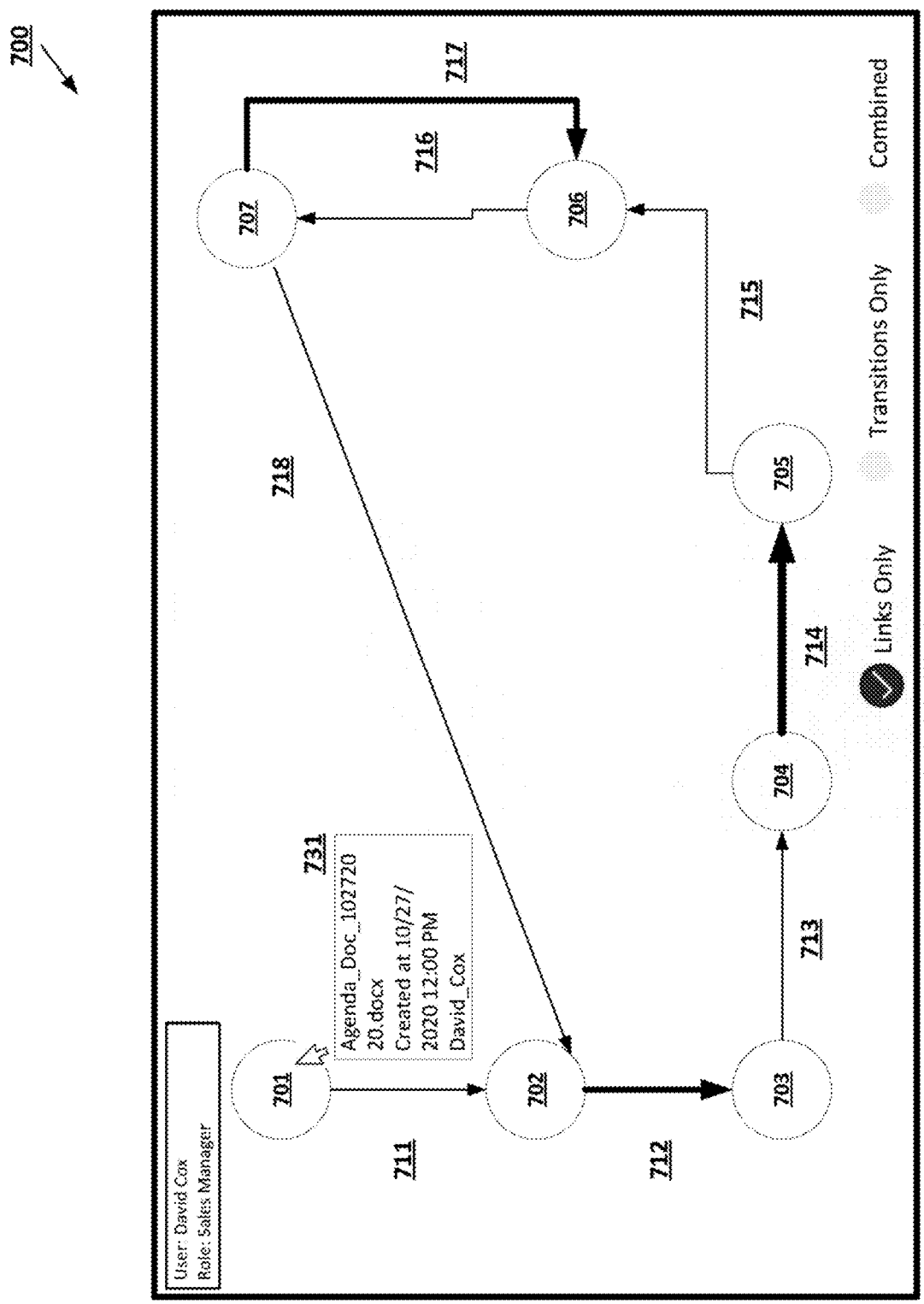
Figure 7B:
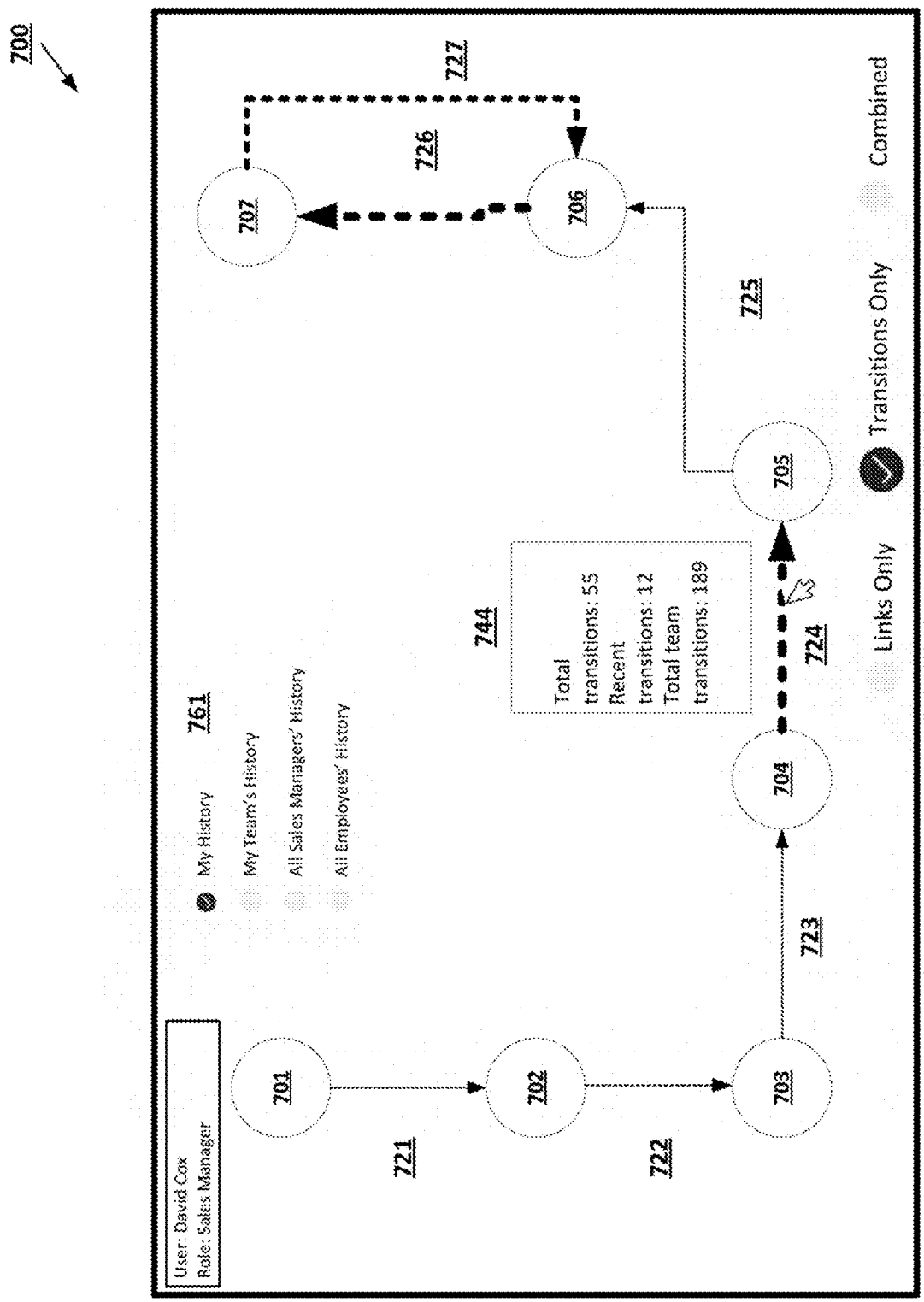
Figure 7C:
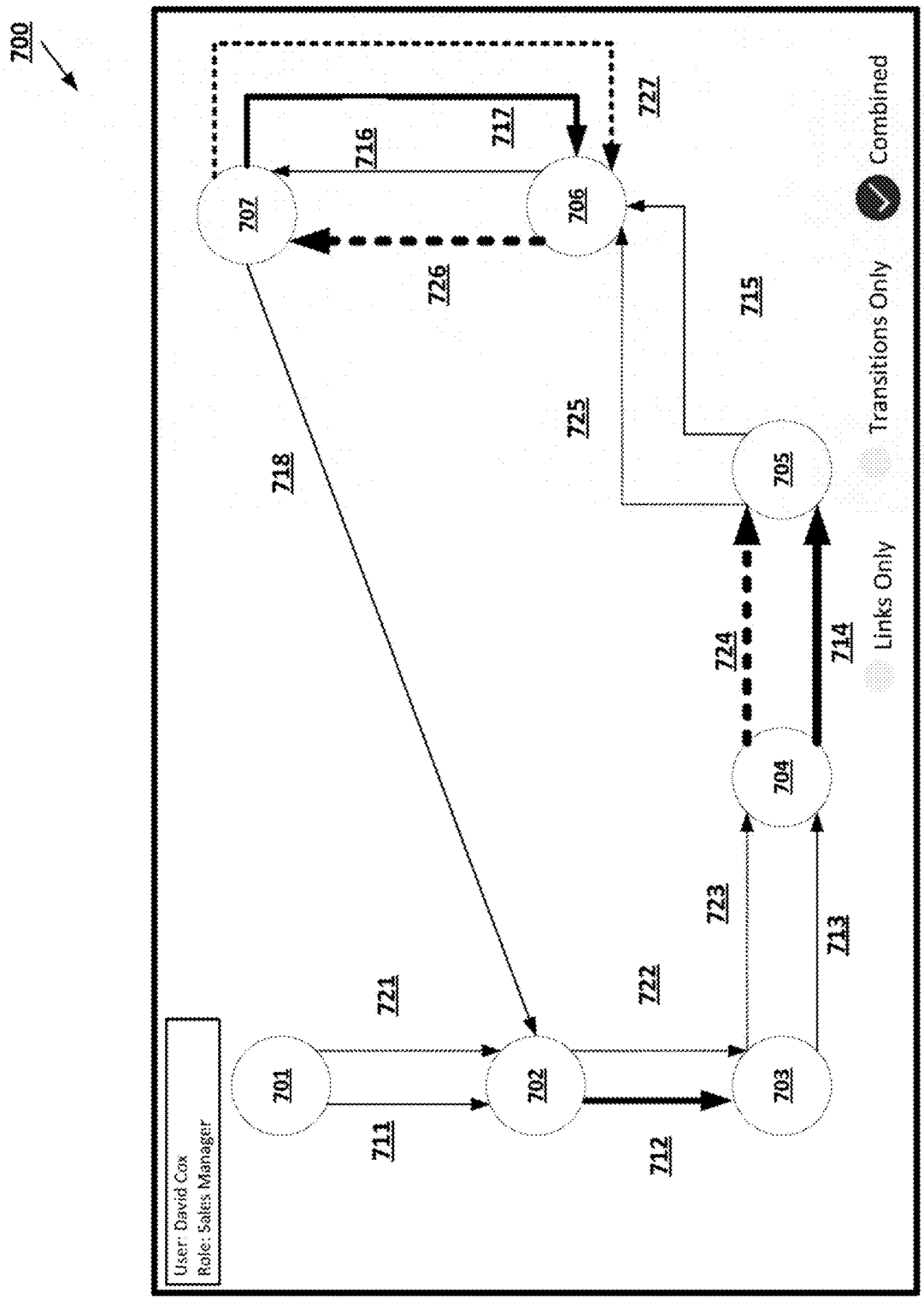

FIGS. 7A-7C provide operational examples of a collaborative document graph-based user interface in accordance with at least some embodiments of the present invention.

Figure 8:
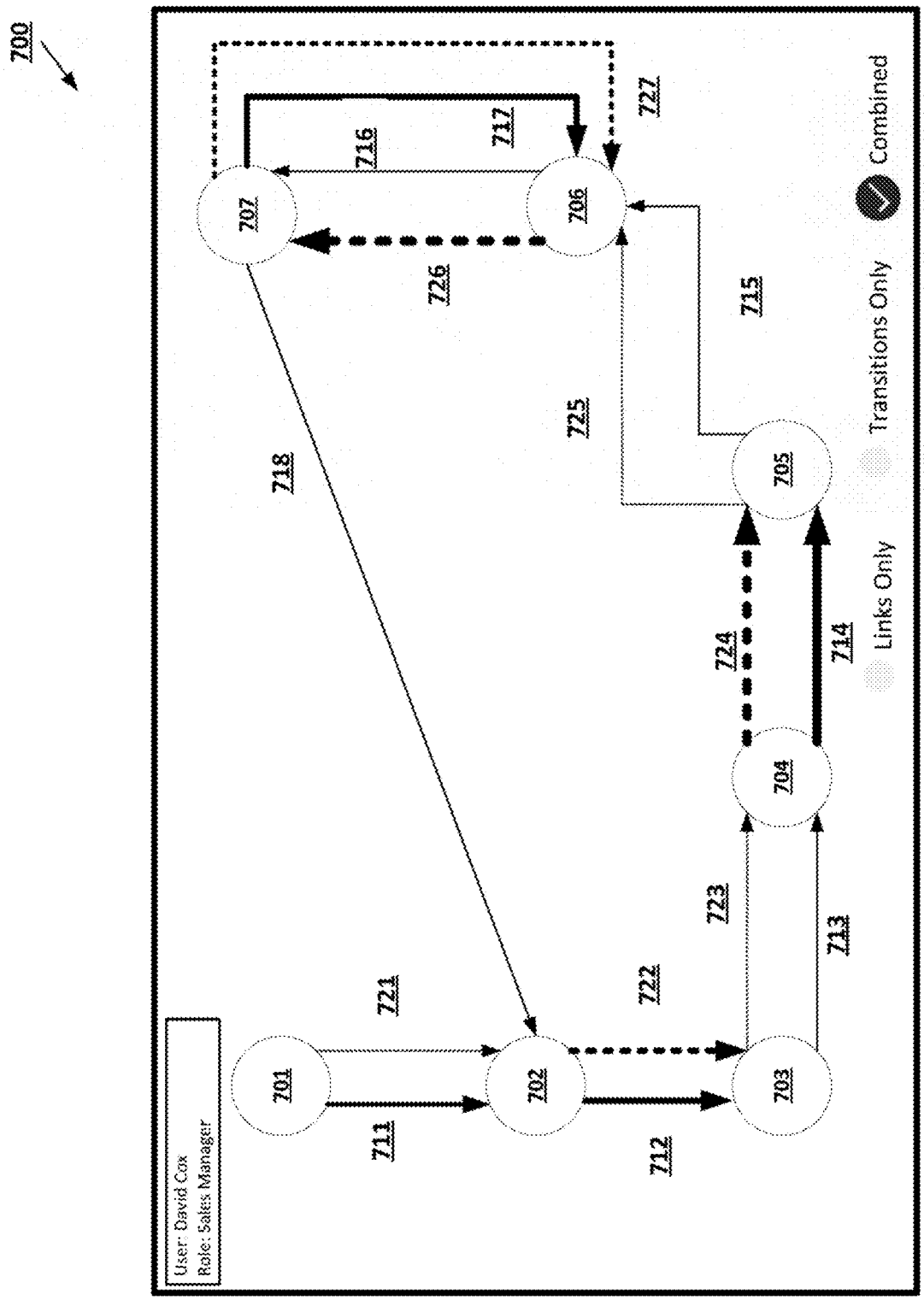

FIG. 8 provides an operational example of an updated collaborative document graph-based user interface configured in accordance with at least some embodiments of the present invention.

Figure 9:
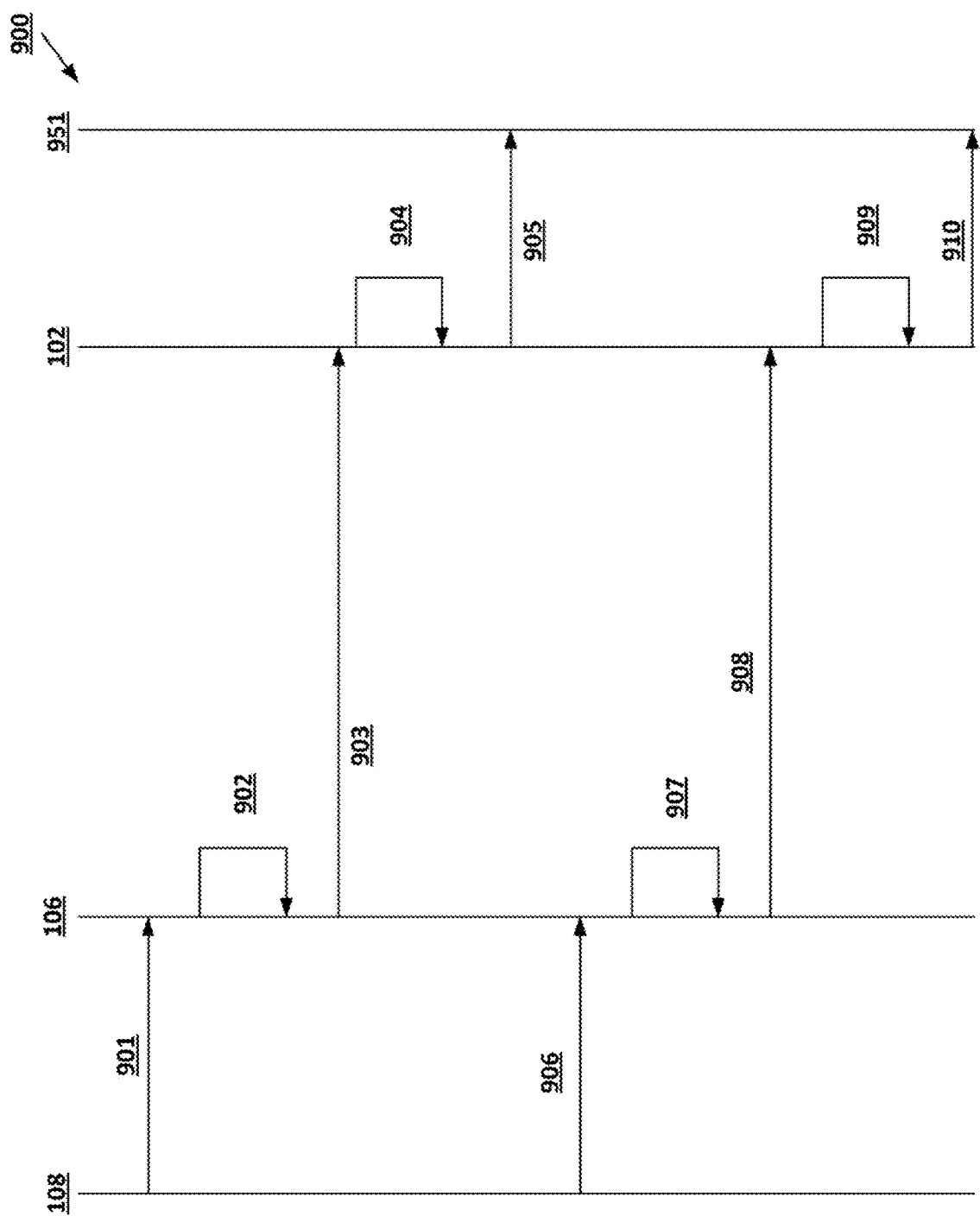

FIG. 9 is a distributed operational flow diagram of an example process for dynamically updating a collaborative document graph-based user interface in accordance with at least some embodiments of the present invention.

Figure 10:
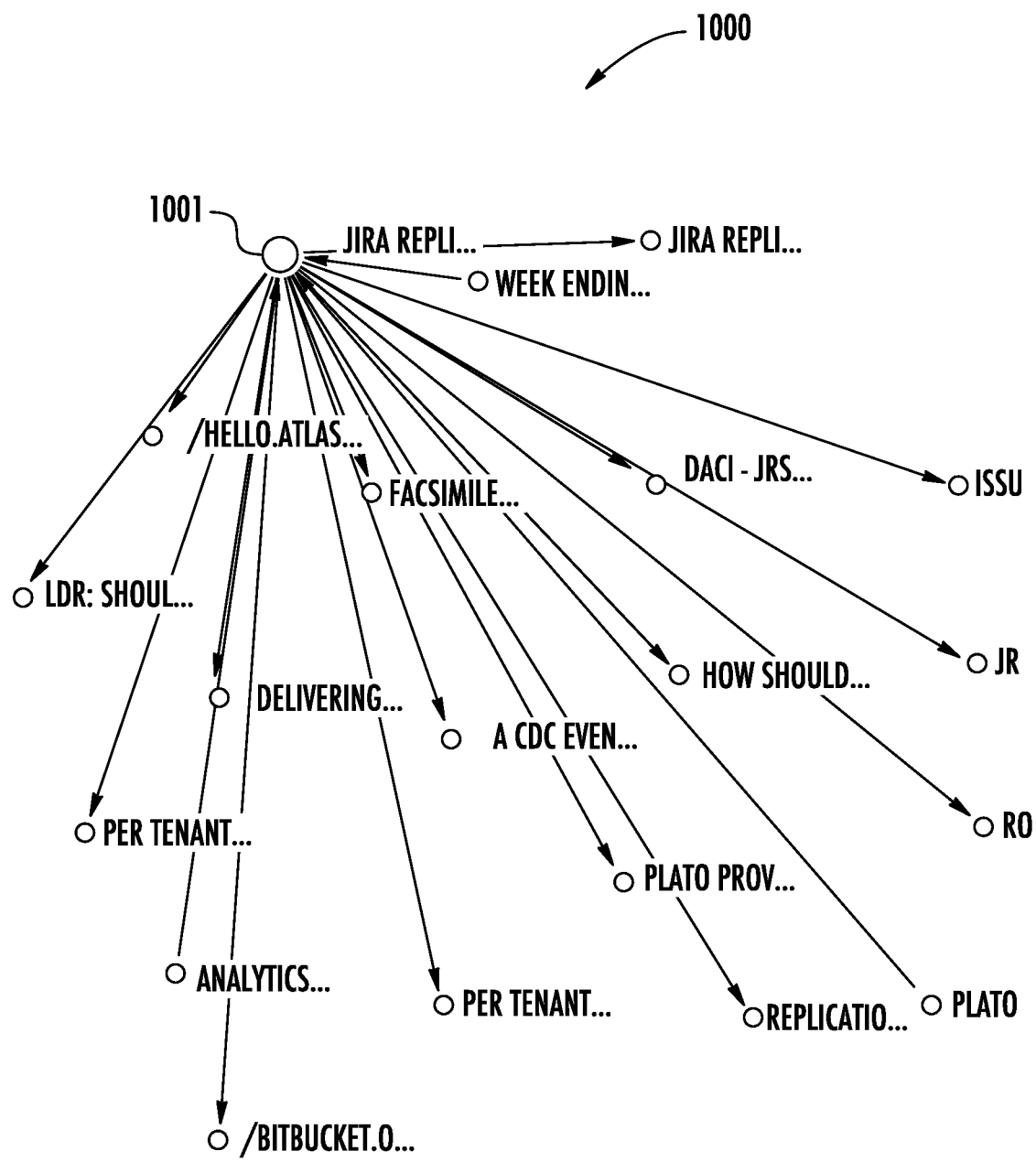
Figure 11A:
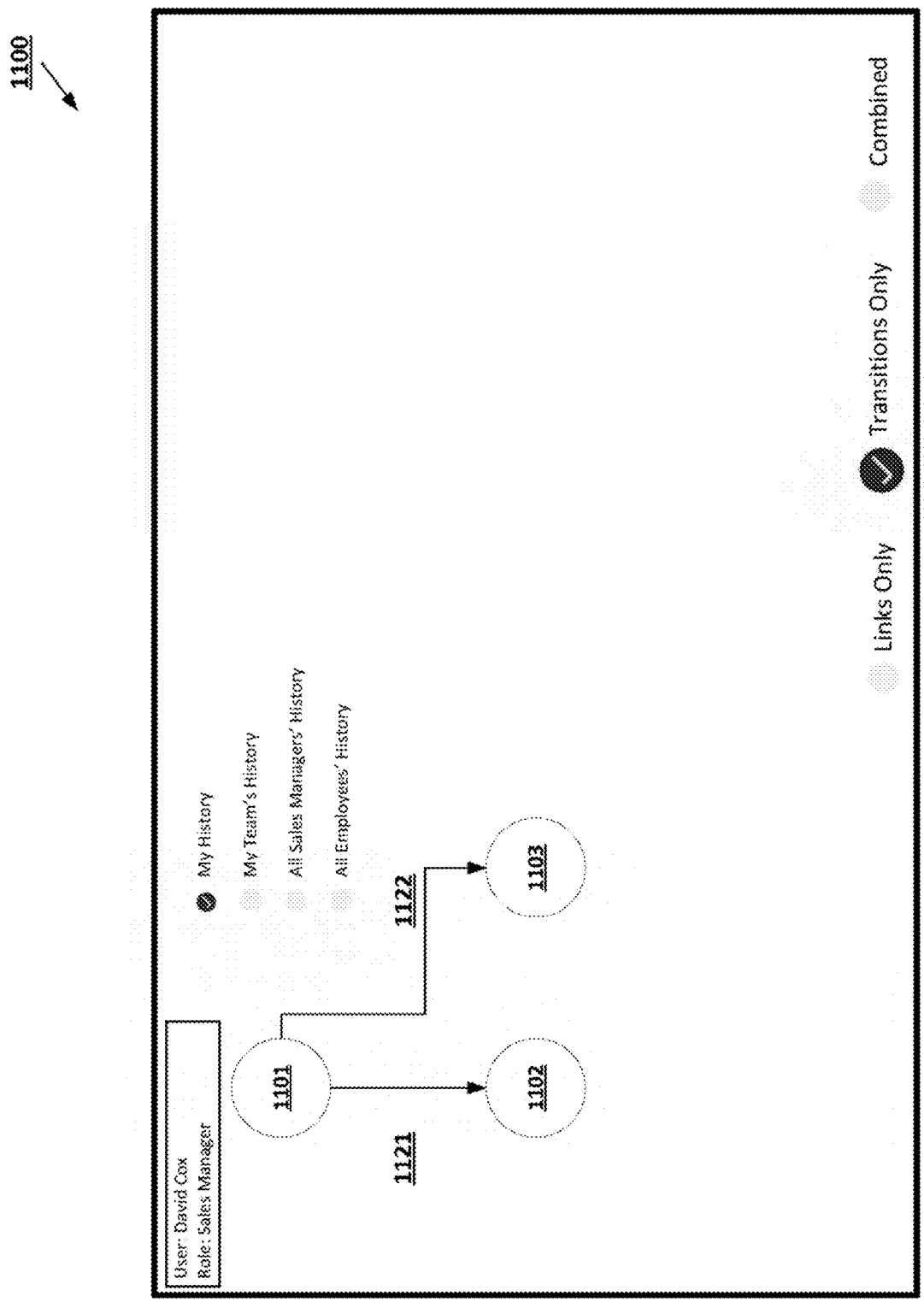
Figure 11B:
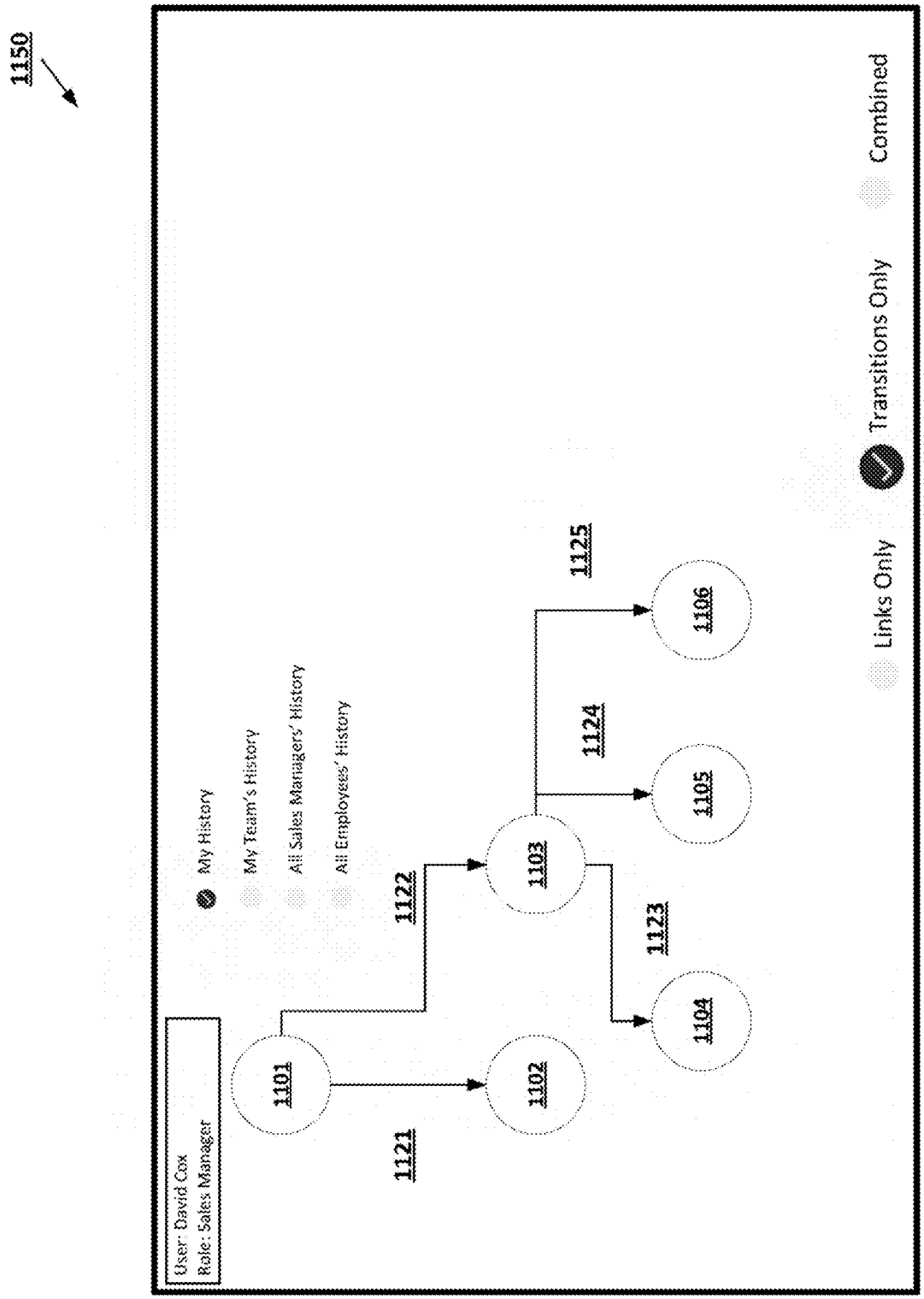

FIGS. 10, 11A, and 11B provide operational examples of three single-root collaborative document graph-based user interfaces in accordance with at least some embodiments of the present invention.

DETAILED DESCRIPTION OF VARIOUS EMBODIMENTS

Various embodiments of the present invention now will be described more fully hereinafter with reference to the accompanying drawings, in which some, but not all embodiments of the disclosure are shown. Indeed, the disclosure may be embodied in many different forms and should not be construed as limited to the embodiments set forth herein. Rather, these embodiments are provided so that this disclosure will satisfy applicable legal requirements. The term "or" is used herein in both the alternative and conjunctive sense, unless otherwise indicated. The terms "illustrative," "example," and "exemplary" are used to be examples with no indication of quality level. Like numbers refer to like elements throughout.

Overview

Various embodiments of the present invention address technical problems associated with generating and efficiently and reliably retrieving collaborative documents from a document collaborative server system in an efficient manner that reduces computational load and query latency. The disclosed techniques can be utilized by a document collaboration server system in presenting aggregate document transitional data collected across user profiles accessing the document collaboration server system. The described feature enables user profiles to utilize the data generated by recording interactions of other profiles to explore collaborative documents, which in turn likely reduces the number of user-initiated queries for new collaborative documents, and thus improves the computational efficiency of the document collaboration server systems. An example of a document collaboration server system that may use the efficiency-enhancing techniques disclosed herein is the Confluence® collaborative document management platform that is owned by Atlassian PTY LTD.

Document collaboration server systems often store a large number of collaborative documents that may be accessible/editable by two or more user profiles. Each collaborative document may at each time be accessed by a group of user profiles that is larger than the group of user profiles that created the documents, and different portions of collaborative documents may be created by different user profiles. Moreover, various collaborative documents created by different groups of user profiles may contain links/references to each other and may enable user profiles to transition from one collaborative document to another collaborative document by selecting the noted links/references. A consequence of this complexity in cross-document relationships enabled by a document collaboration server system is the large number of document access queries generated by often non-author user profiles in order to explore the large number of interconnected collaborative documents available to them, which in turn imposes a large computational burden on the processing capabilities and network capabilities of the document collaboration server system.

For example, consider a set of nine collaborative documents that are fully interconnected, such that each collaborative document includes a single link to every other collaborative document. Without receiving metadata about the relative significance of the links between the collaborative documents, an end-user may end up making up to nine cross-document transitions, at each time potentially generating a separate document access query whose processing may impose considerable computational costs on the document collaboration server system. This may happen despite the fact that some of the cross-document connections may be of little significance as suggested by predictive inferences made based on data about referential significance of cross-document connections and/or based on data about past user transitions across collaborative documents.

To address the above-noted challenges associated with the numerosity of document access queries in complex document relationship environments enabled by document collaboration server systems, various embodiments of the present invention provide end-users with collaborative document graph-based user interfaces that provide metadata information about referential relationships and/or user transitional patterns across collaborative documents. Importantly, in at least some of the noted embodiments, the collaborative document graph-based user interfaces are designed to be dynamically updatable, in order to provide the most updated cross-document user transition data to the end-users and facilitate reliable and efficient decision-making by those end-users. The objective of the noted embodiments is to reduce the computational load currently imposed on document collaboration server systems that host complex document relationship environments, such as on Confluence®.

However, to facilitate the above-noted efficiency-enhancing objective in a client-server architecture, it was deemed technologically advantageous to reduce the computational load on client computing devices and the network transmission load on networks used to transmit graph-based data in the client-server architecture. Accordingly, various embodiments of the present invention reduce the computational load on client computing devices by performing the computationally costly operations needed to detect changes to document user transition data on server systems and transmitting the results of the noted operations to the client computing devices as edge-wise visual effect objects. Moreover, various other embodiments of the present invention reduce the network transmission load on networks by avoiding the need for transmission of the often-large-in-size user interface data to client systems, a feature that is enabled by transmitting the underlying data needed to generate user interfaces over the networks and configuring the client device to generate user interfaces based on the received underlying data. Over time, the client systems can use techniques such as caching and/or memorization to further reduce the computational cost of generating updated user interfaces without incurring any additional network transmission costs.

Thus, by utilizing various combinations of the numerous efficiency-enhancing techniques described above, various embodiments of the present invention provide efficient and reliable techniques for presenting aggregate document transitional data across user profiles accessing a document collaboration server system to end-users of the noted document collaboration server system. In doing so, various embodiments of the present invention enable user profiles to utilize the data generated by recording interactions of other user profiles to explore collaborative documents in making decisions about efficient document exploration given a complex document exploration space. This capability likely reduces the number of user-initiated queries for new collaborative documents, and thus improves the computational efficiency and operational reliability of the document collaboration server systems that host and provide access to complex document exploration spaces.

Various embodiments of the present invention improve the computational efficiency and reliability of performing document discovery tasks. For example, in some embodiments, because various documents (e.g., articles, pages, and/or the like) are represented as collaborative document node elements and the cross-document transition edge elements between the noted documents are determined based on relationships between those documents (e.g., referential relationships between the documents), a document discovery system can perform efficient document discovery for a source document given the links associated with the node for the source document. Accordingly, by facilitating efficient and reliable document discovery, various embodiments of the present invention improve the computational efficiency and reliability of performing document discovery tasks like document recommendation, document search, document search result personalization, and/or the like.

Various embodiments of the present invention reduce cross-document retrieval latency by storing collaborative documents as graph node objects. Empirical experiments by the inventors show that storing collaborative documents as graph node objects could reduce the latency associated with retrieving first-degree, second-degree, and third-degree cross-document retrievals significantly. This is contrast to existing document retrieval approaches that have high retrieval latencies when extracting recursive connections beyond second-degree connections, as the multiplicity of application programming interface (API) calls slows down the real-time result generation when multiple retries are made. In addition, graph node object representation can facilitate generating predictive insights about cross-document relationships, topical associations between groups of documents, document popularities, and ideal storage locations for storing documents in order to enhance reachability/viewability of the noted documents. Furthermore, because graph node objects are easy to share and extend, utilizing graph node object representation facilitates sharing and expansion of document data stored by a document collaboration server system.

Definitions

As used herein, the terms "data," "content," "digital content," "digital content object," "information," and similar terms may be used interchangeably to refer to data capable of being transmitted, received, and/or stored in accordance with embodiments of the present invention. Thus, use of any such terms should not be taken to limit the spirit and scope of embodiments of the present invention. Further, where a computing device is described herein to receive data from another computing device, it will be appreciated that the data may be received directly from another computing device or may be received indirectly via one or more intermediary computing devices, such as, for example, one or more servers, relays, routers, network access points, base stations, hosts, and/or the like, sometimes referred to herein as a "network." Similarly, where a computing device is described herein to send data to another computing device, it will be appreciated that the data may be sent directly to another computing device or may be sent indirectly via one or more intermediary computing devices, such as, for example, one or more servers, relays, routers, network access points, base stations, hosts, and/or the like.

The terms "computer-readable storage medium" refers to a non-transitory, physical or tangible storage medium (e.g., volatile or non-volatile memory), which may be differentiated from a "computer-readable transmission medium," which refers to an electromagnetic signal.

The term "client computing device" refers to a combination of computer hardware and/or software that is configured to access a service made available by a server. The server is often (but not always) on another computer system, in which case the client accesses the service by way of a network. Client computing devices may include, without limitation, smart phones, tablet computers, laptop computers, wearables, personal computers, enterprise computers, and the like.

The term "server computing device" refers to a combination of computer hardware and/or software that is configured to provide a service to a client device. An example of a server computing device is the document collaboration server computing device 106 of FIG. 1. In some embodiments, a server computing device communicates with one or more client computing devices using one or more computer networks.

The term "collaborative document" refers to a data construct that describes contents of a text-based format file (e.g., a Rich Text Format (RTF) file), where the contents of the text-based format file are configured to be editable/accessible by two or more user profiles. The collaborative document may be stored in a storage subsystem of a document collaboration server system. For example, the document collaboration server system may enable a first user profile to share a collaborative document with one or more other user profiles, where each of the one or more user profiles may be given defined read/write access privileges. An example of a collaborative document is a Confluence® page.

The term "collaborative document graph-based user interface" refers to an electronic display that is generated by a client computing device and then presented to an end-user of the client computing device. The client computing device is configured to generate the collaborative document graph-based user interface based on a collaborative document graph-based interface object, where the collaborative document graph-based interface object is generated by a document collaboration server computing device and transmitted by the document collaboration server computing device to the client computing device. The collaborative document graph-based user interface describes relationships between a group of collaborative document node elements each associated with a collaborative document via a group of document transition edge elements. For example, a collaborative document graph-based user interface may display a group of collaborative document node elements each associated with a collaborative document and a group of document transition edge elements, where the existence of a document transition edge element between two collaborative document node elements describes that the two collaborative documents associated with the two collaborative document node elements are associated with a cross-document transitional relationship as defined by collaborative document user transition data associated with the two collaborative documents.

The term "collaborative document graph-based interface object" refers to a data construct that is generated by a document collaboration server computing device and transmitted by the document collaboration server computing device to the client computing device. The client computing device is configured to generate a collaborative document graph-based user interface based on the collaborative document graph-based interface object and present the collaborative document graph-based user interface to an end-user of the client computing device. The collaborative document graph-based interface object describes the collaborative document node elements and the document transition edge elements associated with the corresponding collaborative document graph-based user interface. For example, a collaborative document graph-based interface object may describe the collaborative document node elements and the document transition elements associated with a corresponding collaborative document graph-based user interface using Hypertext Markup Language (HTML) data.

The term "collaborative document node element" refers to a visual element that is generated by a client computing device and presented to an end-user of the client computing device as part of a collaborative document graph-based user interface. The client computing device is configured to generate the collaborative document node element based on a corresponding collaborative document node object in a collaborative document graph-based interface object, where the collaborative document graph-based interface object is generated by a document collaboration server computing device and transmitted by the document collaboration server computing device to the client computing device. The collaborative document node element depicts a visual representation of a collaborative document associated with the corresponding collaborative document node object, as well as optionally one or more document property data fields described by the corresponding collaborative document node object. For example, a collaborative document node element may describe an identifier of the corresponding collaborative document, a revision history of the corresponding collaborative document, a location of the corresponding collaborative document, a size of the corresponding collaborative document, and/or the like.

The term "collaborative document node object" describes a data object that is generated by a document collaboration server computing device and transmitted by the document collaboration server computing device to a client computing device as part of a collaborative document graph-based interface object. The collaborative document node object describes one or more document property data fields associated with a corresponding collaborative document that is stored in a storage subsystem of a document collaboration server system that is associated with the document collaboration server computing device. For example, the collaborative document node object may describe an identifier of the corresponding collaborative document, a revision history of the corresponding collaborative document, a location of the corresponding collaborative document, a size of the corresponding collaborative document, identifiers of one or more authors of the corresponding collaborative documents, identifiers of any users that have viewed the corresponding collaborative document, the comments associated with the corresponding collaborative document, one or more user privilege definitions associated with the corresponding collaborative document, precomputed values associated with the corresponding collaborative document (e.g., a precomputed rank of the collaborative document, such as a rank that is computed using PageRank and/or using Hyperlink-Induced Topic Search (HITS)). and/or the like. The client computing device is configured to process the collaborative document node object to generate a collaborative document node element for the corresponding collaborative document in a collaborative document graph-based user interface, where the collaborative document node element depicts a visual representation of a collaborative document associated with the corresponding collaborative document node object, as well as optionally the one or more document property data fields described by the corresponding collaborative document node object.

The term "document transition edge element" refers to a visual element that is generated by a client computing device and presented to an end-user of the client computing device as part of a collaborative document graph-based user interface. The client computing device is configured to generate the document transition edge element based on a corresponding document transition edge object in a collaborative document graph-based interface object, where the collaborative document graph-based interface object is generated by a document collaboration server computing device and transmitted by the document collaboration server computing device to the noted client computing device. The document transition edge element depicts a visual representation of a cross-document transitional relationship between two corresponding collaborative documents as described by the corresponding document transition object. The document transition edge element may further describe one or more relationship property data fields associated with the cross-document transitional relationship. Examples of relationship property data fields include a relationship type data field, a referential frequency measure, a transitional frequency measure, a referential recency measure, and a transitional recency measure.

The term "document transition edge object" describes a data object that is generated by a document collaboration server computing device and transmitted by the document collaboration server computing device to a client computing device as part of a collaborative document graph-based interface object. The document transition edge object describes the existence of a cross-document transitional relationship between two collaborative documents. For example, a particular document transition edge object may describe that a first collaborative document links to a second collaborative document. As another example, a particular document transition edge object may describe that, during a document viewing session, a target user profile has selected a link from a first collaborative document to a second collaborative document. As yet another example, a particular document transition edge object may describe that a group of user profiles (e.g., a group of user profiles in a team of a target user profile) have over the course of one or more document viewing sessions selected a link from a first collaborative document to a second collaborative document. The document transition edge object may further describe one or more relationship property data fields for the cross-document transitional relationship between the two collaborative documents. Examples of relationship property data fields for a cross-document transitional relationship include at least one of a referential intensity measure for two corresponding collaborative document node objects associated with the two collaborative documents, a transitional frequency measure for two corresponding collaborative document node objects associated with the two collaborative documents, a transitional recency measure for two corresponding collaborative document node objects associated with the two collaborative documents, and/or the like.

The term "collaborative document user transition data" refers to one or more data objects that are generated by a document collaboration server computing device and maintained in a storage subsystem of a document collaboration server system that is associated with the document collaboration server computing device. The collaborative document user transition data is configured to describe one or more referential associations between a group of collaborative documents and/or one or more transitional associations between a group of collaborative documents. A referential association between two collaborative documents describes that a first collaborative document of the two collaborative documents includes a link/reference to a second collaborative document of the two collaborative documents. A transitional association between two collaborative documents describes that a particular user profile has selected to transition from a first collaborative document of the two collaborative documents to a second collaborative document of the two collaborative documents by selecting a link to the second collaborative document in the first collaborative document. The document collaboration server computing device is configured to generate document transition edge elements based on the collaborative document user transition data. In some embodiments, the collaborative document transition data are determined based on the transition history of a target user profile currently viewing a collaborative document graph-based user interface, a team profile associated with the target user profile, a community of user profiles, and/or the like. In some embodiments, a transitional association between two collaborative documents is determined based on user activity data for a target user profile during a historical document viewing session, user activity data for a team profile associated with the target user profile during one or more historical document viewing sessions, during a historical document viewing session for a community of user profiles during one or more historical document viewing sessions, and/or the like. In some embodiments, the user activity data is recorded using a web browser extension that enables recording tab changes and active tabs. In some embodiments, a transitional association between two collaborative documents is determined based on document browsing timestamps (i.e., document access timestamps) for a target collaborative document. In some embodiments, a referential association between two collaborative documents is determined based on metadata information about one or both of the two collaborative documents, such as based on the Incoming Links and Outgoing Links fields of a Page Information file for a Confluence® page.

The term "cross-document transitional relationship" describes a data object that is generated by a document collaboration server computing device based on the collaborative user transition data. The cross-document transitional relationship describes an aggregate association between two corresponding collaborative documents, as well as optionally one or more relationship property data fields for the aggregate association. For example, a particular cross-document transitional relationship may describe that the number of links/references from a first collaborative document of the two collaborative documents to a second collaborative document of the two collaborative documents is above a unidirectional link/reference count threshold. As another example, a particular cross-document transitional relationship may describe that the number of links/references between a first collaborative document of the two collaborative documents and a second collaborative document of the two collaborative documents is above a bidirectional link/reference count threshold. As yet another example, a particular cross-document transitional relationship may describe that a count of end-user transitions from a first collaborative document of the two collaborative documents to a second collaborative document of the two collaborative documents is above a unidirectional transition count threshold. As a further example, a particular cross-document transitional relationship may describe that a count of end-user transitions between a first collaborative document of the two collaborative documents and a second collaborative document of the two collaborative documents is above a bidirectional transition count threshold.

The term "edge-wise visual effect" refers to a visual element that is generated by a client computing device and presented to an end-user of the client computing device as a modification to a current visual state of a document transition edge element. The client computing device is configured to generate the edge-wise visual effect based on an edge-wise visual effect object, wherein the edge-wise visual effect object is generated by a document collaboration server computing device and transmitted by the document collaboration server computing device to the client computing device. The edge-wise visual effect may, for example, change a coloring scheme of the corresponding document transition edge element and/or change a width intensity of the corresponding document transition edge element.

The term "edge-wise visual effect object" refers to a data construct that is generated by a document collaboration server computing device and transmitted by the document collaboration server computing device to the client computing device. The edge-wise visual effect object describes a change in one or more relationship property data fields of a corresponding cross-document transitional relationship that is associated with a corresponding document transition edge object for the edge-wise visual effect object. For example, the document collaboration server computing device may generate the edge-wise visual effect object based on a referential frequency measure for the two collaborative document node objects that are associated with the corresponding cross-document transitional relationship. As another example, the document collaboration server computing device may generate the edge-wise visual effect object based on a transitional frequency measure for the two collaborative document node objects that are associated with the corresponding cross-document transitional relationship. As another example, the document collaboration server computing device may generate the edge-wise visual effect object based on a transitional frequency measure for the two collaborative document node objects that are associated with the corresponding cross-document transitional relationship. As yet another example, the document collaboration server computing device may generate the edge-wise visual effect object based on a transitional recency measure for the two collaborative document node objects that are associated with the corresponding cross-document transitional relationship. The client computing device is configured to update a collaborative document graph-based user interface to apply the edge-wise visual effect to a document transition edge element of the collaborative document graph-based user interface that is associated with the document transition edge object. In some embodiments, updating the collaborative document graph-based user interface to apply the edge-wise visual effect to a selected document transition edge element comprises modifying a coloring scheme of the selected document transition edge element. In some embodiments, updating the collaborative document graph-based user interface to apply the edge-wise visual effect to a selected document transition edge element comprises modifying a width intensity of the selected document transition edge element.

The term "relationship property data field" refers to a data construct that is generated by a document collaboration server computing device based on the collaborative user transition data. The relationship property data field is configured to describe one or more attributes of the aggregate association that is associated with a corresponding cross-document transitional relationship. As described above, a cross-document transitional relationship may describe one or more relationship property data fields for the aggregate association that is associated with the cross-document transitional relationship. Examples of relationship property data fields include a relationship type data field, a referential frequency measure, a transitional frequency measure, a referential recency measure, and a transitional recency measure.

The term "relationship type data field" refers to a relationship property data field that describes an aggregate type of a corresponding cross-document transitional relationship. For example, a relationship type data field for a corresponding cross-document transitional relationship may describe whether the corresponding cross-document transitional relationship is a unidirectional referential relationship for two collaborative documents (i.e., where the cross-document transitional relationship describes that the number of links/references from a first collaborative document of the two collaborative documents to a second collaborative document of the two collaborative documents is above a unidirectional link/reference count threshold), a bidirectional referential relationship for two collaborative documents (i.e., where the cross-document transitional relationship describes that the number of links/references between a first collaborative document of the two collaborative documents and a second collaborative document of the two collaborative documents is above a bidirectional link/reference count threshold), a unidirectional transitional relationship (i.e., where the cross-document transitional relationship describes that a count of end-user transitions from a first collaborative document of the two collaborative documents to a second collaborative document of the two collaborative documents is above a unidirectional transition count threshold), and/or a bidirectional transitional relationship (i.e., where the cross-document transitional relationship describes that a count of end-user transitions between a first collaborative document of the two collaborative documents and a second collaborative document of the two collaborative documents is above a bidirectional transition count threshold).

A "referential frequency measure" may refer to a relationship property data field that is configured to describe a count of unidirectional links/references from a first collaborative document of two collaborative documents to a second collaborative document of the two collaborative documents. For example, the referential frequency measure may describe that there are ten links/references to the second collaborative document in the first collaborative document.

A "referential recency measure" may refer to a relationship property data field that is configured to describe a measure of recency of creation of unidirectional links/references from a first collaborative document of two collaborative documents to a second collaborative document of the two collaborative documents. For example, a referential recency measure may describe a count of unidirectional links/references from the first collaborative document to the second collaborative document that are created within a recent time period (e.g., within the last week). As another example, a referential recency measure may describe a ratio of unidirectional links/references from the first collaborative document to the second collaborative document that are created within a recent time period (e.g., within the last week).

A "transitional frequency measure" may refer to a relationship property data field that is configured to describe a count of transitions from a first collaborative document of two collaborative documents to a second collaborative document of the two collaborative documents by a group of target user profiles. For example, the transitional frequency measure may describe a count of transitions from a first collaborative document of two collaborative documents to a second collaborative document of the two collaborative documents by a target user profile. As another example, the transitional frequency measure may describe a count of transitions from a first collaborative document of two collaborative documents to a second collaborative document of the two collaborative documents by all user profiles of a document collaboration server system. As yet another example, the transitional frequency measure may describe a count of transitions from a first collaborative document of two collaborative documents to a second collaborative document of the two collaborative documents by a team/group of user profiles that is associated with a target user profile.

A "transitional recency measure" may refer to a relationship property data field that is configured to describe recency of transitions from a first collaborative document of two collaborative documents to a second collaborative document of the two collaborative documents by a group of target user profiles. For example, a referential recency measure may describe a count of transitions from the first collaborative document to the second collaborative document that are performed within a recent time period (e.g., within the last week). As another example, a referential recency measure may describe a ratio of transitions from the first collaborative document to the second collaborative document that are performed within a recent time period (e.g., within the last week). In some embodiments, the transitional recency measure may describe recency of transitions from a first collaborative document of two collaborative documents to a second collaborative document of the two collaborative documents by a target user profile. In some embodiments, the transitional recency measure may describe recency of transitions from a first collaborative document of two collaborative documents to a second collaborative document of the two collaborative documents by all user profiles of a document collaboration server system. In some embodiments, the referential frequency measure may describe recency of transitions from a first collaborative document of two collaborative documents to a second collaborative document of the two collaborative documents by a team/group of user profiles that is associated with a target user profile.

Example System Architecture

Methods, apparatuses, and computer program products of the present invention may be embodied by any of a variety of devices. For example, the method, apparatus, and computer program product of an example embodiment may be embodied by a networked device (e.g., an enterprise platform), such as a server or other network entity, configured to communicate with one or more devices, such as one or more query-initiating computing devices. Additionally or alternatively, the computing device may include fixed computing devices, such as a personal computer or a computer workstation. Still further, example embodiments may be embodied by any of a variety of mobile devices, such as a portable digital assistant (PDA), mobile telephone, smartphone, laptop computer, tablet computer, wearable, or any combination of the aforementioned devices.

Figure 1:
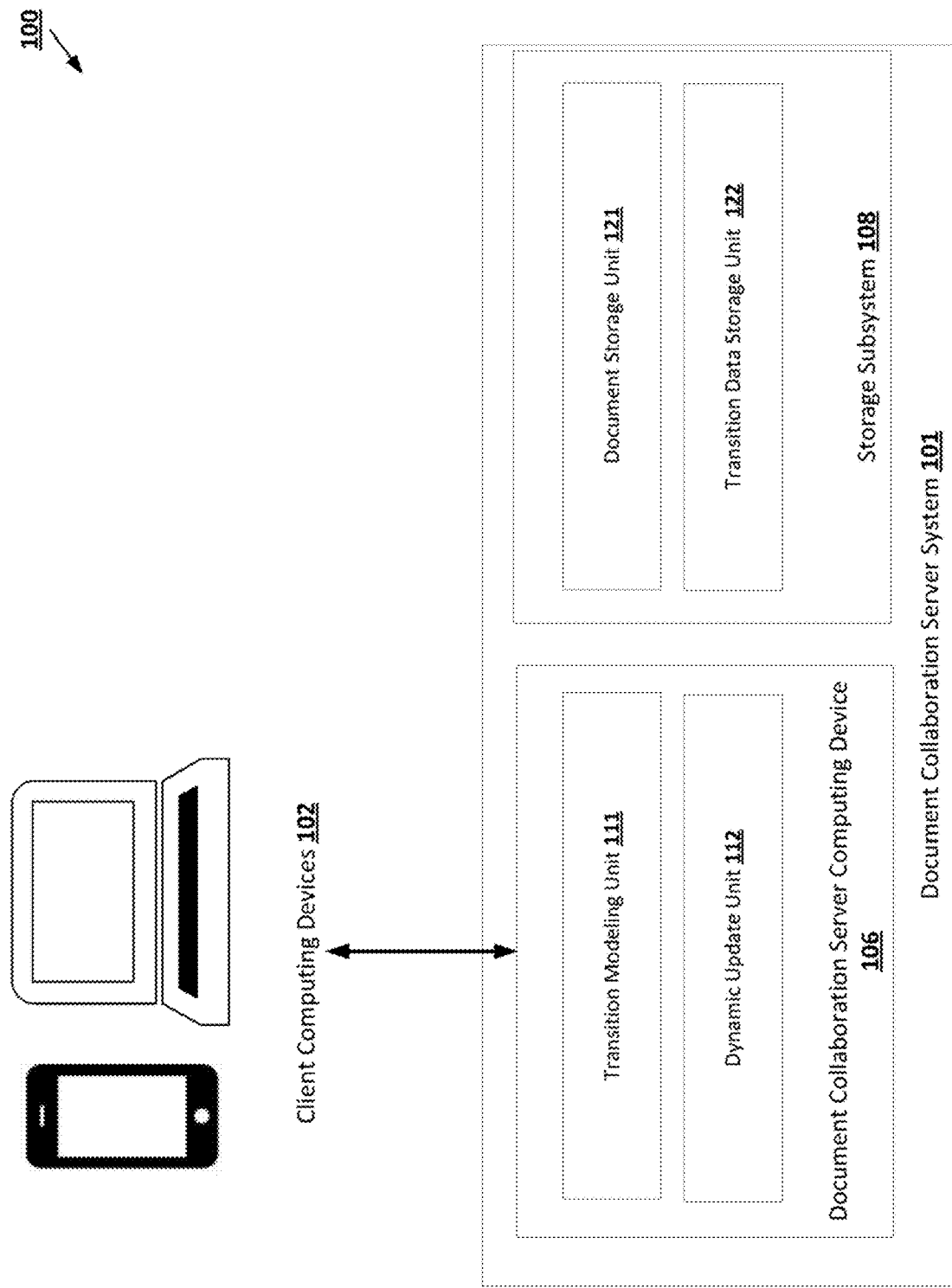
FIG. 1 is a block diagram of an example document collaboration server system architecture within which at least some embodiments of the present invention may operate.

FIG. 1 depicts an exemplary architecture 100 for dynamically updating a document collaboration graph-based interface. The architecture 100 includes one or more client computing devices 102 and a document collaboration server system 101. The document collaboration server system 101 is configured to store collaborative documents in a storage subsystem 108, provide the collaborative documents in response to user queries transmitted by the client computing devices 102, generate dynamically updatable document collaboration graph-based interfaces using the document collaboration server computing device 106, and provide dynamically updatable document collaboration graph-based interfaces to client computing devices 102 in response to user requests for the noted dynamically updatable document collaboration graph-based interfaces as transmitted by the client computing devices 102.

The storage subsystem 108 of the document collaboration server system 101 is configured to store document content data in a document storage unit 121 and collaborative document user transition data in a transition data storage unit 122. The document collaboration server computing device 106 of the document collaboration server system 101 includes a transition modeling unit 111 that is configured to generate document collaboration graph-based interface objects and a dynamic update unit 112 that is configured to generate edge-wise visual effect objects for the document collaboration graph-based interface objects.

The client computing devices 102 and the document collaboration server computing device 106 may communicate over one or more networks. A network may include any wired or wireless communication network including, for example, a wired or wireless local area network (LAN), personal area network (PAN), metropolitan area network (MAN), wide area network (WAN), or the like, as well as any hardware, software and/or firmware required to implement it (such as, e.g., network routers, etc.). For example, a network may include a cellular telephone, an 802.11, 802.16, 802.20, and/or WiMax network. Further, a network may include a public network, such as the Internet, a private network, such as an intranet, or combinations thereof, and may utilize a variety of networking protocols now available or later developed including, but not limited to Transmission Control Protocol/Internet Protocol (TCP/IP) based networking protocols. For instance, the networking protocol may be customized to suit the needs of the page management system. In some embodiments, the protocol is a custom protocol of JavaScript Object Notation (JSON) objects sent via a Websocket channel. In some embodiments, the protocol is JSON over RPC, JSON over REST/HTTP, and the like.

Exemplary Document Collaboration Server Computing Device

Figure 2:
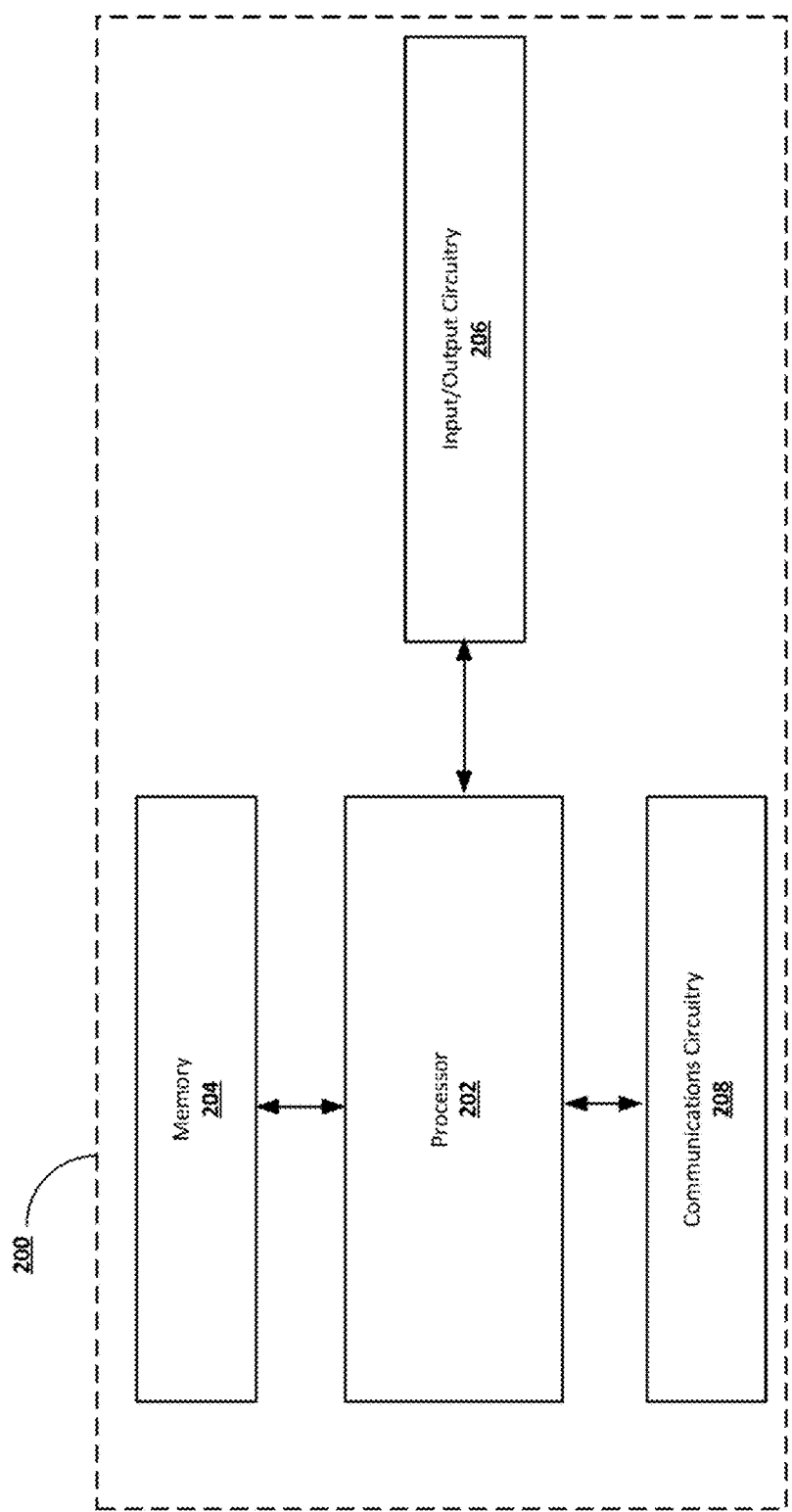
FIG. 2 is a block diagram of an example document collaboration server computing device structured in accordance with at least some embodiments of the present invention.

The document collaboration server computing device 106 may be embodied by one or more computing systems, such as apparatus 200 shown in FIG. 2. The apparatus 200 may include processor 202, memory 204, input/output circuitry 206, and communications circuitry 208. The apparatus 200 may be configured to execute the operations described herein. Although these components 202-208 are described with respect to functional limitations, it should be understood that the particular implementations necessarily include the use of particular hardware. It should also be understood that certain of these components 202-208 may include similar or common hardware. For example, two sets of circuitries may both leverage use of the same processor, network interface, storage medium, or the like to perform their associated functions, such that duplicate hardware is not required for each set of circuitries.

In some embodiments, the processor 202 (and/or co-processor or any other processing circuitry assisting or otherwise associated with the processor) may be in communication with the memory 204 via a bus for passing information among components of the apparatus. The memory 204 is non-transitory and may include, for example, one or more volatile and/or non-volatile memories. In other words, for example, the memory 204 may be an electronic storage device (e.g., a computer-readable storage medium). The memory 204 may be configured to store information, data, content, applications, instructions, or the like for enabling the apparatus to carry out various functions in accordance with example embodiments of the present invention.

The processor 202 may be embodied in a number of different ways and may, for example, include one or more processing devices configured to perform independently. In some preferred and non-limiting embodiments, the processor 202 may include one or more processors configured in tandem via a bus to enable independent execution of instructions, pipelining, and/or multithreading. The use of the term "processing circuitry" may be understood to include a single core processor, a multi-core processor, multiple processors internal to the apparatus, and/or remote or "cloud" processors.

In some preferred and non-limiting embodiments, the processor 202 may be configured to execute instructions stored in the memory 204 or otherwise accessible to the processor 202. In some preferred and non-limiting embodiments, the processor 202 may be configured to execute hard-coded functionalities. As such, whether configured by hardware or software methods, or by a combination thereof, the processor 202 may represent an entity (e.g., physically embodied in circuitry) capable of performing operations according to an embodiment of the present invention while configured accordingly. Alternatively, as another example, when the processor 202 is embodied as an executor of software instructions, the instructions may specifically configure the processor 202 to perform the algorithms and/or operations described herein when the instructions are executed.

In some embodiments, the apparatus 200 may include input/output circuitry 206 that may, in turn, be in communication with processor 202 to provide output to the user and, in some embodiments, to receive an indication of a user input. The input/output circuitry 206 may comprise a user interface and may include a display, and may comprise a web user interface, a mobile application, a query-initiating computing device, a kiosk, or the like. In some embodiments, the input/output circuitry 206 may also include a keyboard, a mouse, a joystick, a touch screen, touch areas, soft keys, a microphone, a speaker, or other input/output mechanisms. The processor and/or user interface circuitry comprising the processor may be configured to control one or more functions of one or more user interface elements through computer program instructions (e.g., software and/ or firmware) stored on a memory accessible to the processor (e.g., memory 204, and/or the like).

The communications circuitry 208 may be any means such as a device or circuitry embodied in either hardware or a combination of hardware and software that is configured to receive and/or transmit data from/to a network and/or any other device, circuitry, or module in communication with the apparatus 200. In this regard, the communications circuitry 208 may include, for example, a network interface for enabling communications with a wired or wireless communication network. For example, the communications circuitry 208 may include one or more network interface cards, antennae, buses, switches, routers, modems, and supporting hardware and/or software, or any other device suitable for enabling communications via a network. Additionally or alternatively, the communications circuitry 208 may include the circuitry for interacting with the antenna/antennae to cause transmission of signals via the antenna/antennae or to handle receipt of signals received via the antenna/antennae.

It is also noted that all or some of the information discussed herein can be based on data that is received, generated and/or maintained by one or more components of apparatus 200. In some embodiments, one or more external systems (such as a remote cloud computing and/or data storage system) may also be leveraged to provide at least some of the functionality discussed herein.

Exemplary Client Computing Device

Figure 3:
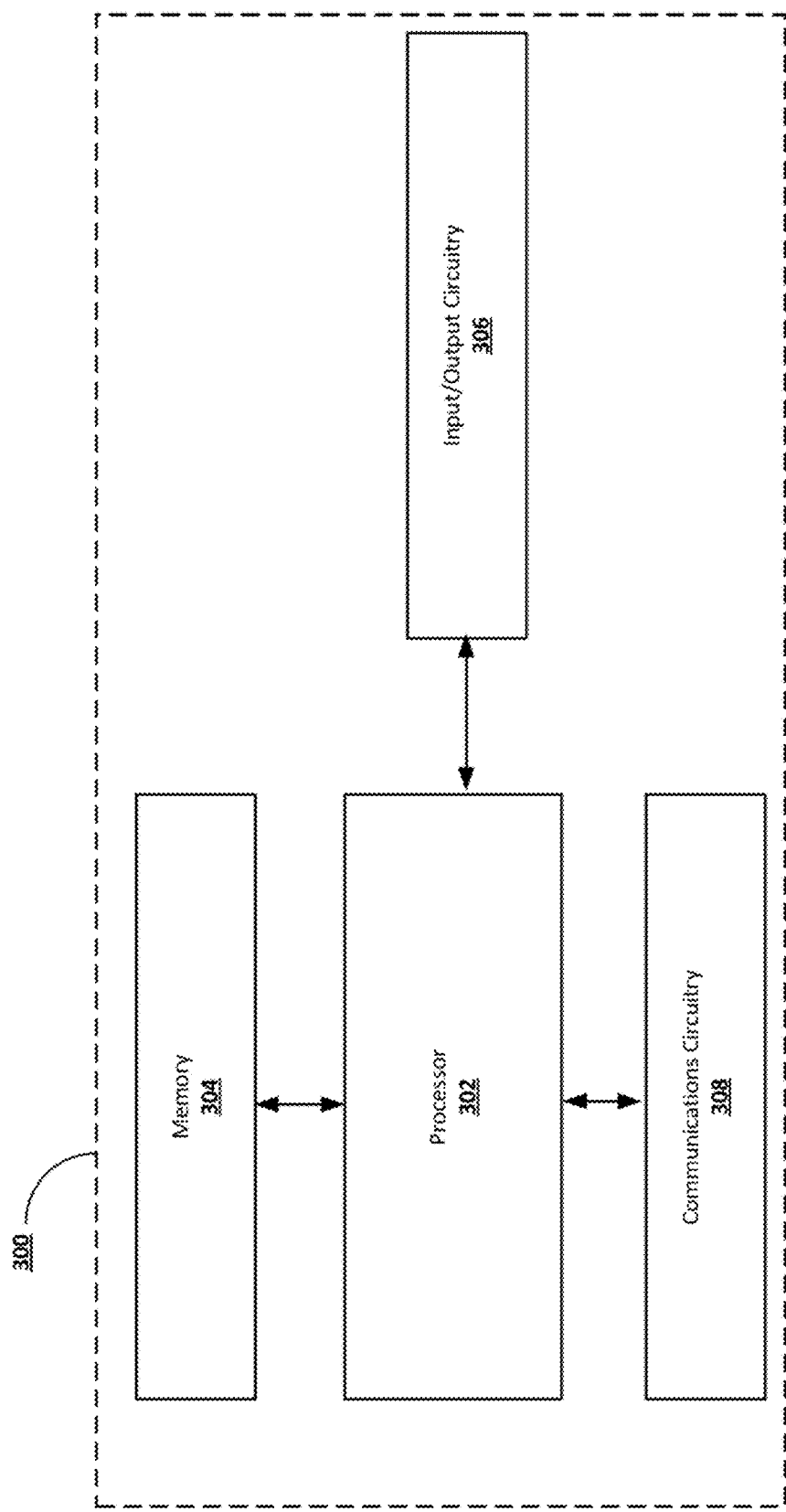
FIG. 3 is a block diagram of an example client computing device structured in accordance with at least some embodiments of the present invention.

Referring now to FIG. 3, a client computing device may be embodied by one or more computing systems, such as apparatus 300 shown in FIG. 3. The apparatus 300 may include processor 302, memory 304, input/output circuitry 306, and a communications circuitry 308. Although these components 302-308 are described with respect to functional limitations, it should be understood that the particular implementations necessarily include the use of particular hardware. It should also be understood that certain of these components 302-308 may include similar or common hardware. For example, two sets of circuitries may both leverage use of the same processor, network interface, storage medium, or the like to perform their associated functions, such that duplicate hardware is not required for each set of circuitries.

In some embodiments, the processor 302 (and/or co-processor or any other processing circuitry assisting or otherwise associated with the processor) may be in communication with the memory 304 via a bus for passing information among components of the apparatus. The memory 304 is non-transitory and may include, for example, one or more volatile and/or non-volatile memories. In other words, for example, the memory 304 may be an electronic storage device (e.g., a computer-readable storage medium). The memory 304 may include one or more databases. Furthermore, the memory 304 may be configured to store information, data, content, applications, instructions, or the like for enabling the apparatus 300 to carry out various functions in accordance with example embodiments of the present invention.

The processor 302 may be embodied in a number of different ways and may, for example, include one or more processing devices configured to perform independently. In some preferred and non-limiting embodiments, the processor 302 may include one or more processors configured in tandem via a bus to enable independent execution of instructions, pipelining, and/or multithreading. The use of the term "processing circuitry" may be understood to include a single core processor, a multi-core processor, multiple processors internal to the apparatus, and/or remote or "cloud" processors.

In some preferred and non-limiting embodiments, the processor 302 may be configured to execute instructions stored in the memory 304 or otherwise accessible to the processor 302. In some preferred and non-limiting embodiments, the processor 302 may be configured to execute hard-coded functionalities. As such, whether configured by hardware or software methods, or by a combination thereof, the processor 302 may represent an entity (e.g., physically embodied in circuitry) capable of performing operations according to an embodiment of the present invention while configured accordingly. Alternatively, as another example, when the processor 302 is embodied as an executor of software instructions (e.g., computer program instructions), the instructions may specifically configure the processor 302 to perform the algorithms and/or operations described herein when the instructions are executed.

In some embodiments, the apparatus 300 may include input/output circuitry 306 that may, in turn, be in communication with processor 302 to provide output to the user and, in some embodiments, to receive an indication of a user input. The input/output circuitry 306 may comprise a user interface and may include a display, and may comprise a web user interface, a mobile application, a query-initiating computing device, a kiosk, or the like.

In embodiments in which the apparatus 300 is embodied by a limited interaction device, the input/output circuitry 306 includes a touch screen and does not include, or at least does not operatively engage (i.e., when configured in a table mode), other input accessories such as tactile keyboards, track pads, mice, etc. In other embodiments in which the apparatus is embodied by a non-limited interaction device, the input/output circuitry 306 may include may include at least one of a tactile keyboard (e.g., also referred to herein as keypad), a mouse, a joystick, a touch screen, touch areas, soft keys, and other input/output mechanisms. The processor and/or user interface circuitry comprising the processor may be configured to control one or more functions of one or more user interface elements through computer program instructions (e.g., software and/or firmware) stored on a memory accessible to the processor (e.g., memory 304, and/or the like).

The communications circuitry 308 may be any means such as a device or circuitry embodied in either hardware or a combination of hardware and software that is configured to receive and/or transmit data from/to a network and/or any other device, circuitry, or module in communication with the apparatus 300. In this regard, the communications circuitry 308 may include, for example, a network interface for enabling communications with a wired or wireless communication network. For example, the communications circuitry 308 may include one or more network interface cards, antennae, buses, switches, routers, modems, and supporting hardware and/or software, or any other device suitable for enabling communications via a network. Additionally or alternatively, the communications circuitry 308 may include the circuitry for interacting with the antenna/antennae to cause transmission of signals via the antenna/antennae or to handle receipt of signals received via the antenna/antennae.

It is also noted that all or some of the information discussed herein can be based on data that is received, generated and/or maintained by one or more components of apparatus 300. In some embodiments, one or more external systems (such as a remote cloud computing and/or data storage system) may also be leveraged to provide at least some of the functionality discussed herein.

Example Data Flows and Operations

Provided below are techniques for dynamically updating a collaborative document graph-based user interface in a client-server architecture. However, a person of ordinary skill in the relevant technology will recognize that the disclosed techniques can be used to update collaborative document graph-based user interfaces in other software architectures, such as in peer-to-peer software architectures. Furthermore, a person of ordinary skill in the relevant technology will recognize that the client-side operations discussed below can be performed without the server-side operations described below and vice versa. Moreover, a person of ordinary skill in the relevant technology will recognize that only some of the operations of the distributed software architecture described with reference to FIG. 9 may be performed without departing from the spirit of various embodiments of the present invention.

Exemplary Server-Side Operations

Figure 4:
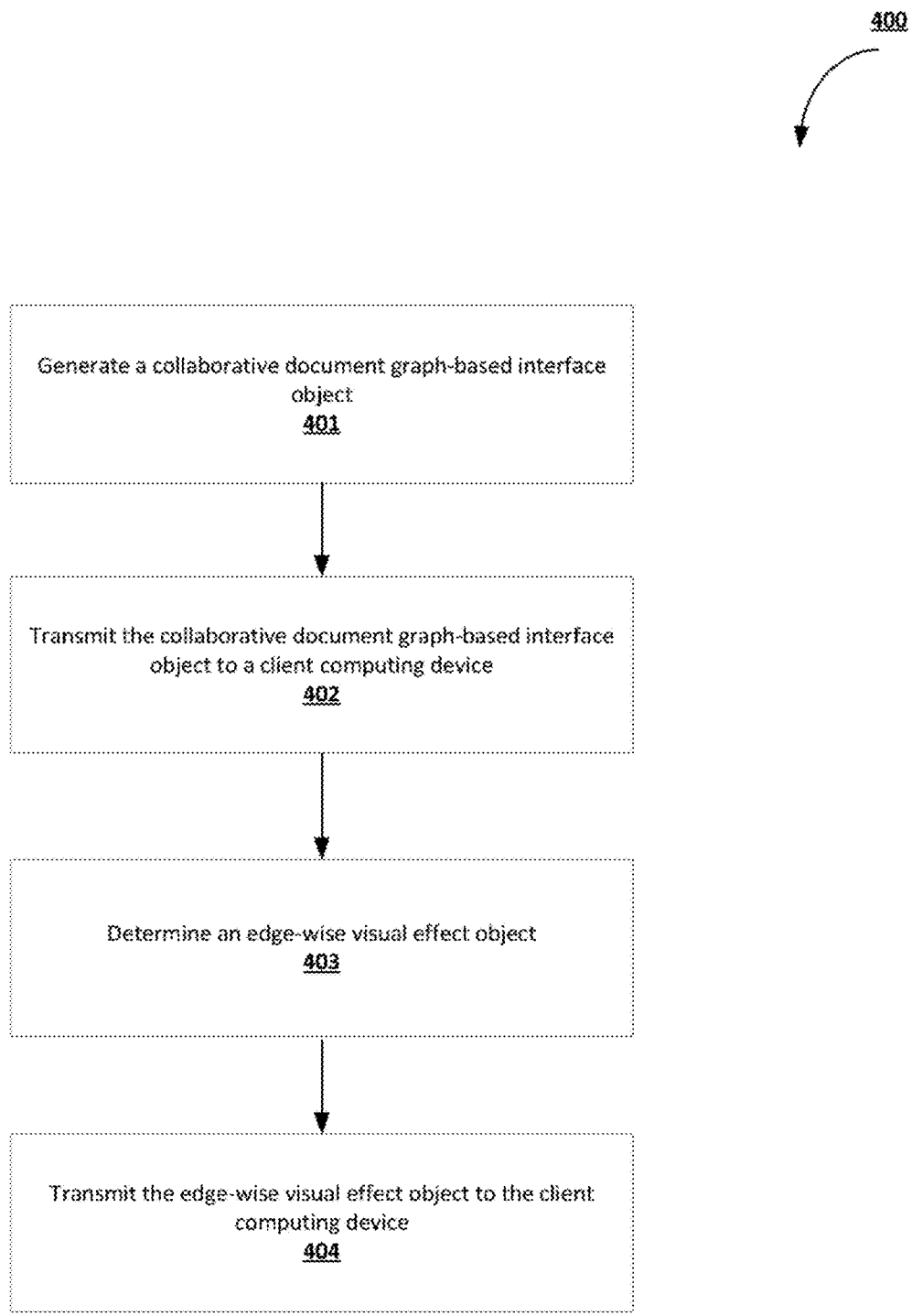
FIG. 4 is a flowchart diagram of an example process for performing server-side operations that are configured to dynamically update a collaborative document graph-based user interface in accordance with at least some embodiments of the present invention.

FIG. 4 is a flowchart diagram of an example process 400 for performing server-side operations that are configured to dynamically update a collaborative document graph-based user interface. Via the various operations of the process 400, the document collaboration server computing device 106 can generate collaborative document graph-based interface objects and edge-wise visual effect objects that are in turn configured to facilitate presenting a dynamically-updatable collaborative document graph-based user interface to a target end-user.

The process 400 begins at operation 401 when the document collaboration server computing device 106 generates a collaborative document graph-based interface object. The collaborative document graph-based interface object describes the collaborative document nodes elements and the document transition edge elements associated with the corresponding collaborative document graph-based user interface. For example, a collaborative document graph-based interface object may describe the collaborative document nodes elements and the document transition elements associated with a corresponding collaborative document graph-based user interface using HTML data.

The collaborative document graph-based interface object includes collaborative document node objects and document transition edge objects. A collaborative document node object describes one or more document property data fields associated with a corresponding collaborative document that is stored in the storage subsystem 108. For example, the collaborative document node object may describe an identifier of the corresponding collaborative document, a revision history of the corresponding collaborative document, a location of the corresponding collaborative document, a size of the corresponding collaborative document, and/or the like. A client computing device 102 is configured to process the collaborative document node object to generate a collaborative document node element for the corresponding collaborative document in a collaborative document graph-based user interface, where the collaborative document node element depicts a visual representation of a collaborative document associated with the corresponding collaborative document node object, as well as optionally the one or more document property data fields described by the corresponding collaborative document node object.

A document transition edge object describes the existence of a cross-document transitional relationship between two collaborative documents. For example, a particular document transition edge object may describe that a first collaborative document links to a second collaborative document. As another example, a particular document transition edge object may describe that, during a document viewing session, a target user profile has selected a link from a first collaborative document to a second collaborative document. As yet another example, a particular document transition edge object may describe that a group of user profiles (e.g., a group of user profiles in a team of a target user profile) have over the course of one or more document viewing sessions selected a link from a first collaborative document to a second collaborative document. A document transition edge object may further describe one or more relationship property data fields for the cross-document transitional relationship between the two collaborative documents. Examples of relationship property data fields for a cross-document transitional relationship include at least one of a referential intensity measure for two corresponding collaborative document node objects associated with the two collaborative documents, a transitional frequency measure for two corresponding collaborative document node objects associated with the two collaborative documents, a transitional recency measure for two corresponding collaborative document node objects associated with the two collaborative documents, and/or the like.

Figure 5:
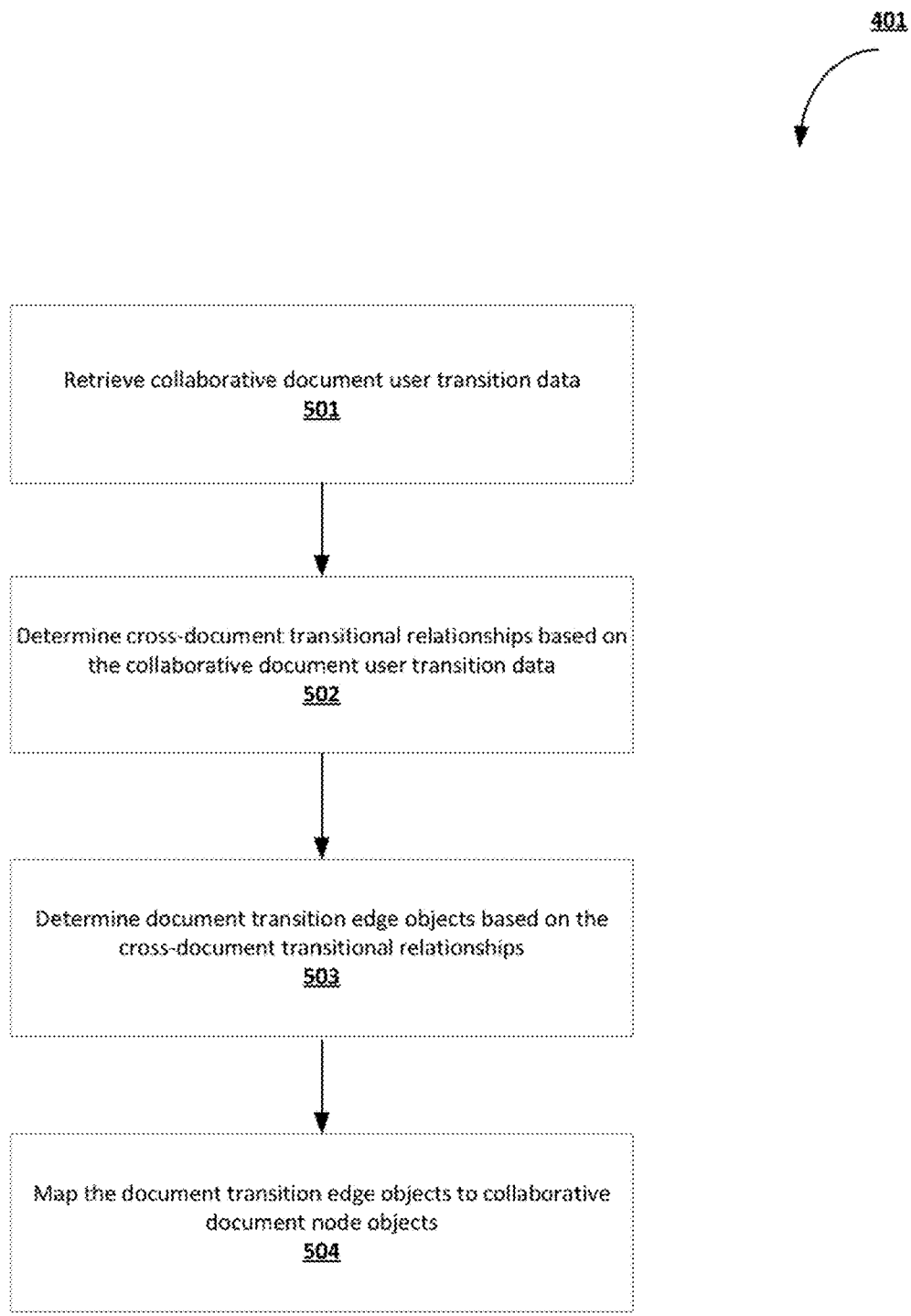
FIG. 5 is a flowchart diagram of an example process for generating a collaborative document graph-based interface object in accordance with at least some embodiments of the present invention.

In some embodiments, operation 401 may be performed in accordance with the process that is depicted in FIG. 5. The process that is depicted in FIG. 5 begins at operation 501 when the document collaboration server computing device 106 retrieves collaborative document user transition data from the storage subsystem 108. The collaborative document user transition data is configured to describe one or more referential associations between a group of collaborative documents and/or one or more transitional associations between a group of collaborative documents. A referential association between two collaborative documents describes that a first collaborative document of the two collaborative documents includes a link/reference to a second collaborative document of the two collaborative documents. A transitional association between two collaborative documents describes that a particular user profile has selected to transition from a first collaborative document of the two collaborative documents to a second collaborative document of the two collaborative documents by selecting a link to the second collaborative document in the first collaborative document. In some embodiments, a transitional association between two collaborative documents is determined based on user activity data for a target user profile during a historical document viewing session. In some embodiments, a transitional association between two collaborative documents is determined based on document browsing timestamps (i.e., document access timestamps) for a target collaborative document.

At operation 502, the document collaboration server computing device 106 determines one or more cross-document transitional relationships based on the collaborative document user transition data. A cross-document transitional relationship describes an aggregate association between two corresponding collaborative documents, as well as optionally one or more relationship property data fields for the aggregate association. For example, a particular cross-document transitional relationship may describe that the number of links/references from a first collaborative document of the two collaborative documents to a second collaborative document of the two collaborative documents is above a unidirectional link/reference count threshold. As another example, a particular cross-document transitional relationship may describe that the number of links/references between a first collaborative document of the two collaborative documents and a second collaborative document of the two collaborative documents is above a bidirectional link/reference count threshold. As yet another example, a particular cross-document transitional relationship may describe that a count of end-user transitions from a first collaborative document of the two collaborative documents to a second collaborative document of the two collaborative documents is above a unidirectional transition count threshold. As a further example, a particular cross-document transitional relationship may describe that a count of end-user transitions between a first collaborative document of the two collaborative documents and a second collaborative document of the two collaborative documents is above a bidirectional transition count threshold.

As described above, a cross-document transitional relationship may describe one or more relationship property data fields for the aggregate association that is associated with the cross-document transitional relationship. A relationship property data field describes one or more attributes of the aggregate association that is associated with the cross-document transitional relationship. Examples of relationship property data fields include a relationship type data field, a referential frequency measure, a transitional frequency measure, a referential recency measure, and a transitional recency measure.

A relationship type data field describes an aggregate type of a corresponding cross-document transitional relationship. For example, a relationship type data field for a corresponding cross-document transitional relationship may describe whether the corresponding cross-document transitional relationship is a unidirectional referential relationship for two collaborative documents (i.e., where the cross-document transitional relationship describes that the number of links/references from a first collaborative document of the two collaborative documents to a second collaborative document of the two collaborative documents is above a unidirectional link/reference count threshold), a bidirectional referential relationship for two collaborative documents (i.e., where the cross-document transitional relationship describes that the number of links/references between a first collaborative document of the two collaborative documents and a second collaborative document of the two collaborative documents is above a bidirectional link/reference count threshold), a unidirectional transitional relationship (i.e., where the cross-document transitional relationship describes that a count of end-user transitions from a first collaborative document of the two collaborative documents to a second collaborative document of the two collaborative documents is above a unidirectional transition count threshold), and/or a bidirectional transitional relationship (i.e., where the cross-document transitional relationship describes that a count of end-user transitions between a first collaborative document of the two collaborative documents and a second collaborative document of the two collaborative documents is above a bidirectional transition count threshold).

A referential frequency measure describes a count of unidirectional links/references from a first collaborative document of two collaborative documents to a second collaborative document of the two collaborative documents. For example, the referential frequency measure may describe that there are ten links/references to the second collaborative document in the first collaborative document.

A referential recency measure describes a measure of recency of creation of unidirectional links/references from a first collaborative document of two collaborative documents to a second collaborative document of the two collaborative documents. For example, a referential recency measure may describe a count of unidirectional links/references from the first collaborative document to the second collaborative document that are created within a recent time period (e.g., within the last week). As another example, a referential recency measure may describe a ratio of unidirectional links/references from the first collaborative document to the second collaborative document that are created within a recent time period (e.g., within the last week).

A transitional frequency measure describes a count of transitions from a first collaborative document of two collaborative documents to a second collaborative document of the two collaborative documents by a group of target user profiles. For example, the transitional frequency measure may describe a count of transitions from a first collaborative document of two collaborative documents to a second collaborative document of the two collaborative documents by a target user profile. As another example, the transitional frequency measure may describe a count of transitions from a first collaborative document of two collaborative documents to a second collaborative document of the two collaborative documents by all user profiles of the document collaboration server system 101. As yet another example, the transitional frequency measure may describe a count of transitions from a first collaborative document of two collaborative documents to a second collaborative document of the two collaborative documents by a team/group of user profiles that is associated with a target user profile.

A transitional recency measure describes recency of transitions from a first collaborative document of two collaborative documents to a second collaborative document of the two collaborative documents by a group of target user profiles. For example, a referential recency measure may describe a count of transitions from the first collaborative document to the second collaborative document that are performed within a recent time period (e.g., within the last week). As another example, a referential recency measure may describe a ratio of transitions from the first collaborative document to the second collaborative document that are performed within a recent time period (e.g., within the last week). In some embodiments, the transitional recency measure may describe recency of transitions from a first collaborative document of two collaborative documents to a second collaborative document of the two collaborative documents by a target user profile. In some embodiments, the transitional recency measure may describe recency of transitions from a first collaborative document of two collaborative documents to a second collaborative document of the two collaborative documents by all user profiles of the document collaboration server system 101. In some embodiments, the referential frequency measure may describe recency of transitions from a first collaborative document of two collaborative documents to a second collaborative document of the two collaborative documents by a team/group of user profiles that is associated with a target user profile.

At operation 503, the document collaboration server computing device 106 determines the document transition edge objects based on the cross-document transitional relationships. In some embodiments, each document transition edge object describes the existence of a corresponding cross-document transitional relationship. For example, a document transition edge object may describe the existence of a cross-document transition relationship that is a unidirectional referential relationship, a bidirectional referential relationship, a unidirectional transitional relationship, and/or a bidirectional transitional relationship. As another example, a document transition edge object may describe the existence of a cross-document transition relationship that is two or more of a unidirectional referential relationship, a bidirectional referential relationship, a unidirectional transitional relationship, and/or a bidirectional transitional relationship. In some embodiments, each document transition edge object describes the existence of a corresponding cross-document transitional relationship as well as one or more relationship property data fields associated with the cross-document transitional relationship, such as at least one of a relationship type data field associated with the cross-document transitional relationship, a referential frequency measure associated with the cross-document transitional relationship, a transitional frequency measure associated with the cross-document transitional relationship, a referential recency measure, and a transitional recency measure associated with the cross-document transitional relationship.

At operation 504, the document collaboration server computing device 106 maps the document transition edge objects to collaborative document node objects. In some embodiments, given a document transition edge object that is associated with a cross-document transitional relationship which in turn is associated two collaborative documents, the document collaboration server computing device 106 associates the document transition edge to collaborative document node objects associated with the two noted collaborative documents. In some embodiments, given a document transition edge object that is associated with a unidirectional cross-document transitional relationship which in turn describes a unidirectional aggregate referential/transitional association from a first collaborative document to a second collaborative document, the document collaboration server computing device 106 associates the document transition edge to a source collaborative node object that is associated with the first collaborative document and a destination collaborative node object that is associated with the second collaborative document. In some embodiments, given a document transition edge object that is associated with a bidirectional cross-document transitional relationship which in turn describes a bidirectional aggregate referential/transitional association between two collaborative documents, the document collaboration server computing device 106 associates the document transition edge to collaborative document node objects associated with the two noted collaborative documents.

Returning to FIG. 4, at operation 402, the document collaboration server computing device 106 transmits the collaborative document graph-based interface object to a client computing device 102 to cause the client computing device 102 to present the collaborative document graph-based user interface based on the collaborative document graph-based interface object. For example, the document collaboration server computing device 106 may transmit the collaborative document graph-based interface object to the client computing device 102 as HTML data. The collaborative document graph-based user interface depicts a plurality of collaborative document node elements that are visually connected, at least partly, by a plurality of document transition edge elements, wherein the plurality of document transition edge elements are configured to visually represent the collaborative document user transition data. Collaborative document graph-based user interfaces, collaborative document node elements, and document transition edge elements are described in greater detail below with reference to FIG. 6 and the exemplary client-side operations configured to generate a dynamically updatable collaborative document graph-based user interface.

At operation 403, the document collaboration server computing device 106 determines an edge-wise visual effect object associated with a selected document transition edge object of the collaborative document graph-based interface object. The selected document transition edge object is associated with the selected document transition edge of the collaborative document graph-based user interface, where the selected document transition edge element is defined between a first collaborative document node element of the collaborative document graph-based user interface and a second collaborative document node element of the collaborative document graph-based user interface, and the edge-wise visual effect object is determined based on a subset of the collaborative document user transition data that is associated with a first collaborative document node object corresponding to the first collaborative document node element and a second collaborative document node object corresponding to the second collaborative document node element.

In some embodiments, if the selected document transition edge object is a unidirectional document transition edge object, the edge-wise visual effect object is determined based on cross-document transitional relationships that describe a unidirectional aggregate association from the first collaborative document to the second collaborative document. In some embodiments, if the selected document transition edge object is a bidirectional document transition edge object, the edge-wise visual effect object is determined based on cross-document transitional relationships that describe a bidirectional aggregate association between the first collaborative document to the second collaborative document.

The edge-wise visual effect object describes a change in one or more relationship property data fields of a corresponding cross-document transitional relationship that is associated with a corresponding document transition edge object for the edge-wise visual effect object. For example, the document collaboration server computing device 106 may generate the edge-wise visual effect object based on a referential frequency measure for the two collaborative document node objects that are associated with the corresponding cross-document transitional relationship. As another example, the document collaboration server computing device 106 may generate the edge-wise visual effect object based on a transitional frequency measure for the two collaborative document node objects that are associated with the corresponding cross-document transitional relationship. As another example, the document collaboration server computing device 106 may generate the edge-wise visual effect object based on a transitional frequency measure for the two collaborative document node objects that are associated with the corresponding cross-document transitional relationship. As yet another example, the document collaboration server computing device may 106 generate the edge-wise visual effect object based on a transitional recency measure for the two collaborative document node objects that are associated with the corresponding cross-document transitional relationship.

As described below, the client computing device 102 is configured to update a collaborative document graph-based user interface to apply the edge-wise visual effect to a document transition edge element of the collaborative document graph-based user interface that is associated with the document transition edge object. In some embodiments, updating the collaborative document graph-based user interface to apply the edge-wise visual effect to a selected document transition edge element comprises modifying a coloring scheme of the selected document transition edge element. In some embodiments, updating the collaborative document graph-based user interface to apply the edge-wise visual effect to the selected document transition edge element comprises modifying a width intensity of the selected document transition edge element.

At operation 404, the document collaboration server computing device 106 transmits the edge-wise visual effect object to the client computing device 102. For example, the document collaboration server computing device 106 may transmit the edge-wise visual effect object to the client computing device 102 as HTML data. The client computing device 102 is configured to update the collaborative document graph-based user interface to apply an edge-wise visual effect corresponding to the edge-wise visual effect object to the selected document transition edge element.

Exemplary Client-Side Operations

Figure 6:
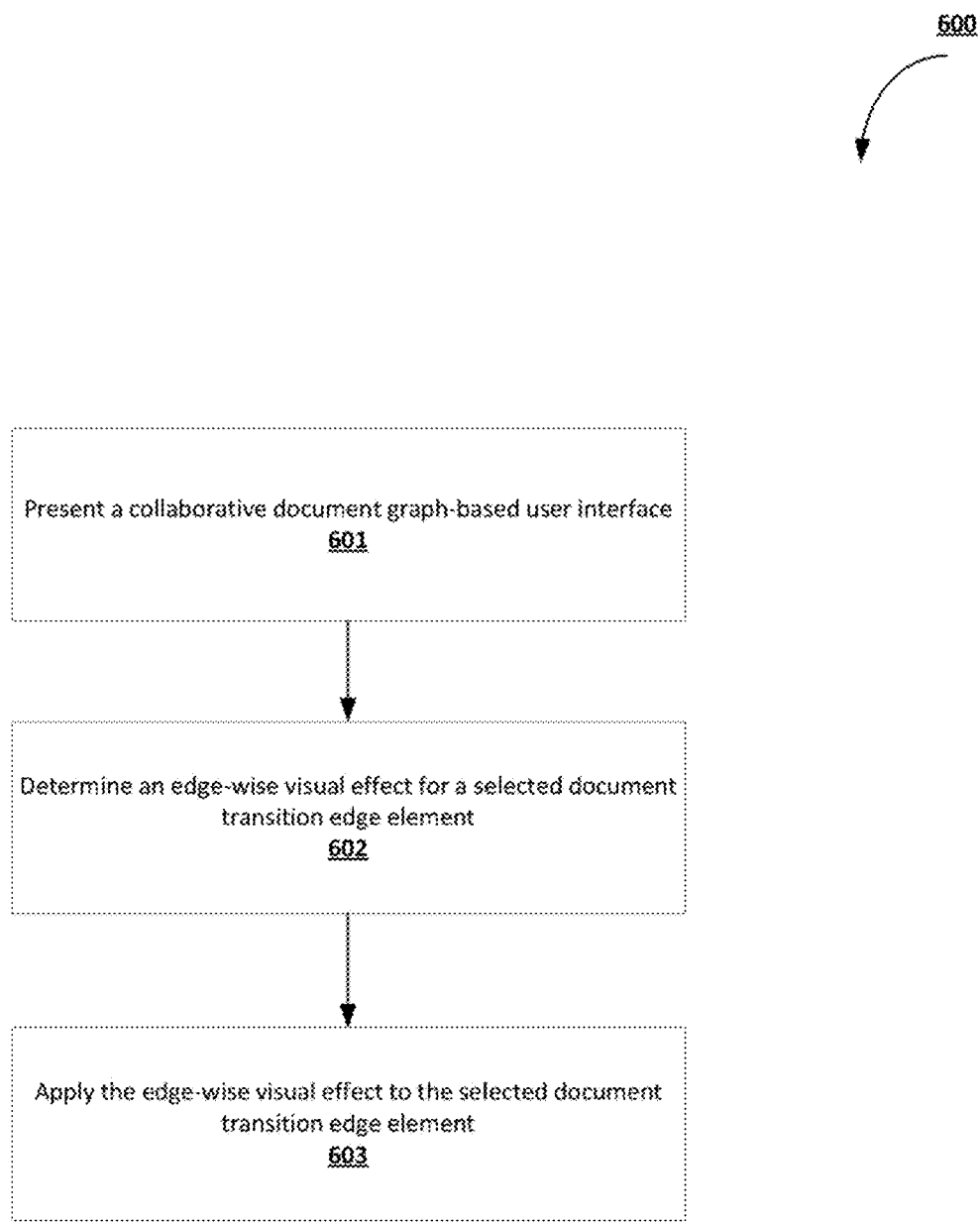
FIG. 6 is a flowchart diagram of an example process for performing client-side operations that are configured to dynamically update a collaborative document graph-based user interface in accordance with at least some embodiments of the present invention.

FIG. 6 is a flowchart diagram of an example process 600 for performing client-side operations that are configured to dynamically update a collaborative document graph-based user interface. Via the various operations of the process 600, an exemplary client computing device 102 can present dynamically-updatable collaborative document graph-based user interfaces to a target end-user.

The process 600 begins at operation 601 when the client computing device 102 presents a collaborative document graph-based user interface. The client computing device 102 is configured to generate the collaborative document graph-based user interface based on a collaborative document graph-based interface object, where the collaborative document graph-based interface object is generated by the document collaboration server computing device 106 and transmitted by the document collaboration server computing device 106 to the client computing device 102. The collaborative document graph-based user interface describes relationships between a group of collaborative document node elements each associated with a collaborative document via a group of document transition edge elements. For example, a collaborative document graph-based user interface may display a group of collaborative document node elements each associated with a collaborative document and a group of document transition edge elements, where the existence of a document transition edge element between two collaborative document node elements describes that the two collaborative documents associated with the two collaborative document node elements are associated with a cross-document transitional relationship as defined by collaborative document user transition data associated with the two collaborative documents.

The collaborative document graph-based user interface depicts a plurality of collaborative document node elements that are visually connected, at least partly, by a plurality of document transition edge elements, wherein the plurality of document transition edge elements are configured to visually represent the collaborative document user transition data. A collaborative document node element is a visual element that is generated by the client computing device 102 and presented to an end-user of the client computing device 102 as part of a collaborative document graph-based user interface. The client computing device 102 is configured to generate the collaborative document node element based on a corresponding collaborative document node object in a collaborative document graph-based interface object, where the collaborative document graph-based interface object is generated by the document collaboration server computing device 106 and transmitted by the document collaboration server computing device 106 to the client computing device 102. The collaborative document node element depicts a visual representation of a collaborative document associated with the corresponding collaborative document node object, as well as optionally one or more document property data fields described by the corresponding collaborative document node object. For example, a collaborative document node element may describe an identifier of the corresponding collaborative document, a revision history of the corresponding collaborative document, a location of the corresponding collaborative document, a size of the corresponding collaborative document, and/or the like.

A document transition edge element is a visual element that is generated by the client computing device 102 and presented to an end-user of the client computing device 102 as part of a collaborative document graph-based user interface. The client computing device 102 is configured to generate the document transition edge element based on a corresponding document transition edge object in a collaborative document graph-based interface object, where the collaborative document graph-based interface object is generated by the document collaboration server computing device 106 and transmitted by the document collaboration server computing device 106 to the noted client computing device 102. The document transition edge element depicts a visual representation of a cross-document transitional relationship between two corresponding collaborative documents as described by the corresponding document transition object. The document transition edge element may further describe one or more relationship property data fields associated with the cross-document transitional relationship. Examples of relationship property data fields include a relationship type data field, a referential frequency measure, a transitional frequency measure, a referential recency measure, and a transitional recency measure.

An operational example of a collaborative document graph-based user interface 700 is depicted in FIGS. 7A-7C. As depicted in FIG. 7A, while in a "links only" mode, the collaborative document graph-based user interface 700 includes the collaborative document node elements 701-707 that each correspond to a collaborative document, as well as document transition edge elements 711-718, where each document transition edge element 711-718 from a particular collaborative document node element to another collaborative document node element describes that the particular collaborative document for the particular collaborative document node element links to the other collaborative document for the other collaborative document node element. For example, as depicted in FIG. 7A, the document transition edge element 711 depicts that the collaborative document corresponding to the collaborative document node element 701 links to the collaborative document corresponding to the collaborative document node element 702.

As further depicted in FIG. 7A, the width of each document transition edge element describes the referential intensity measure for the corresponding cross-document transitional relationship. For example, as depicted in FIG. 7A, the referential intensity measure for the document transition edge element 712 is more than the referential intensity measure for the document transition edge element 713.

As further depicted in FIG. 7A, defined user interactions with particular collaborative document node elements (e.g., hovering of mouse over the particular collaborative document node elements, zooming in on the particular collaborative document node elements, expansion of the screen in an area surrounding the particular collaborative document node elements, and/or the like) displays text boxes that describe document property data fields for the particular collaborative document node elements, such as the text box 731 for the collaborative document node element 701 that describe document property data fields for the collaborative document that is associated with the collaborative document node element 701.

As depicted in FIG. 7B, while in a "transitions only" mode, the collaborative document graph-based user interface 700 includes the collaborative document node elements 701-707 that each correspond to a collaborative document, as well as document transition edge elements 721-727, where each document transition edge element 721-727 from a particular collaborative document node element to another collaborative document node element describes that a target user has transitioned from the particular collaborative document for the particular collaborative document node element to the other collaborative document for the other collaborative document node element with a threshold frequency via one or more references/links between the particular collaborative document and the other collaborative document. For example, as depicted in FIG. 7B, the document transition edge element 721 depicts that a target user profile has transitioned from the collaborative document corresponding to the collaborative document node element 701 links to the collaborative document corresponding to the collaborative document node element 702 with a threshold frequency.

As further depicted in FIG. 7B, the width of each document transition edge element describes the transitional frequency measure for the corresponding cross-document transitional relationship. For example, as depicted in FIG. 7B, the transitional frequency measure for the document transition edge element 724 is more than the transitional frequency measure for the document transition edge element 725.

As further depicted in FIG. 7B, defined user interactions with particular document transition edge elements (e.g., hovering of mouse over the particular document transition edge elements, zooming in on the particular document transition edge elements, expansion of the screen in an area surrounding the particular document transition edge elements, and/or the like) displays text boxes that describe relationships property data fields for the particular document transition edge elements, such as the text box 744 for document transition edge element 724.

As further depicted in FIG. 7B, the "transitions only" mode of the collaborative document graph-based user interface 700 enables (via the selection box collection 761) the user to select the set of user profiles whose document browsing history is used to generate the cross-document transitional relationships depicted by the "transitions only" mode. For example, the user can select to generate the depicted cross-document transitional relationships based on the user's document browsing history alone, based on the document browsing history of the user's team's, based on the document browsing history of all those having the same role as the user, and based on the document history of all employees in the user's company.

As depicted in FIG. 7C, while in a "combined" mode, the collaborative document graph-based user interface 700 includes the collaborative document node elements 701-707 that each correspond to a collaborative document, a first set of document transition edge elements 711-718 that depict referential relationships described in relation to FIG. 7A, and a second set of document transition edge elements 721-727 that depict transitional relationships described in relation to FIG. 7B. Thus, as depicted in FIG. 7C, each document transition edge element 711-718 from a particular collaborative document node element to another collaborative document node element describes that the particular collaborative document for the particular collaborative document node element links to the other collaborative document for the other collaborative document node element, while each document transition edge element 721-727 from a particular collaborative document node element to another collaborative document node element describes that a target user has transitioned from the particular collaborative document for the particular collaborative document node element to the other collaborative document for the other collaborative document node element with a threshold frequency via one or more references/links between the particular collaborative document and the other collaborative document.

In some embodiments, a collaborative document graph-based user interface has a single root collaborative document node element that is associated with a root collaborative document and shows all the n-th degree cross-document transitional relationships for the root collaborative document. For example, the collaborative document graph-based user interface 1000 of FIG. 10 shows all the first-degree cross-document transitional relations for the root collaborative document that is associated with the root collaborative document node element 1001.

In some embodiments, the degree of a cross-document transitional relationship between a source collaborative document node object associated with a source collaborative document and a second collaborative document node object associated with a second collaborative document describes how distant the second collaborative document node object is from the source collaborative document node object in accordance with a collaborative document graph-based user interface object. For example, a first-degree connection between a source collaborative document node object associated with a source collaborative document and a second collaborative document node object associated with a second collaborative document describes that there is a common document transition edge object associated with the source collaborative document node object and the second collaborative document node object. As another example, a second-degree connection between a source collaborative document node object associated with a source collaborative document and a second collaborative document node object associated with a second collaborative document describes that: (i) there is a first-degree cross-document transitional relationship between the source collaborative document node object and a third collaborative document node object, and (ii) there is another first-degree cross-document transitional relationship between the second collaborative document node object and the third collaborative document node object. As a further example, a third-degree connection between a source collaborative document node object associated with a source collaborative document and a second collaborative document node object associated with a second collaborative document describes that: (i) there is a first-degree cross-document transitional relationship between the source collaborative document node object and a third collaborative document node object, (ii) there is another first-degree cross-document transitional relationship between the second collaborative document node object and a fourth collaborative document node object, and (iii) there is another first-degree cross-document transitional relationship between the third collaborative document node object and the fourth collaborative document node object.

In some embodiments, a collaborative document graph-based user interface is configured to depict one or more first-degree document transition edge elements associated with one or more first-degree document transition edge objects, where each first-degree document transition edge object is associated with a first-degree cross-document transitional relationship between a source collaborative document node object and a first-degree collaborative document node object. In some of the noted embodiments, user interaction with a first-degree document transition edge element or a first-degree collaborative document node element associated with a first-degree collaborative document node object causes depicting a set of target second-degree document transition edge elements, where the set of the set of second-degree document transition edge elements correspond to first-degree cross-document transitional relationships of the particular target first-degree collaborative document node object. This capability to "expand" a collaborative document graph-based user interface by interacting with particular collaborative document node elements may be repeated recursively, such that at each recursive level user interaction with a particular n-th degree document transition edge element that is associated with a particular n-th degree collaborative document node object or a particular n-th degree collaborative document node element that is associated with the particular n-th degree collaborative document node object can cause display of n+1-th degree document transition edge elements associated with the particular n-th degree collaborative document node object.

For example, as depicted in FIG. 11A, the single-root collaborative document graph-based user interface 1100 depicts a source collaborative document node element 1101 that is associated with a source collaborative document node object, two first-degree collaborative document node elements 1102-1103, and two first-degree document transition edge elements 1121-1122. The first-degree collaborative document node elements 1102 is associated with a second collaborative document node object, and the first-degree document transition edge element 1121 is associated with a first collaborative document transition edge object that connects the second collaborative document node object to the source collaborative document node object. The first-degree collaborative document node element 1103 is associated with a third collaborative document node object, and the first-degree document transition edge element 1122 is associated with a second collaborative document transition edge object that connects the third collaborative document node object to the source collaborative document node object. As further depicted in FIG. 11A, the cross-document transitional relationships described by the single-root collaborative document graph-based user interface 1100 are determined based on a "transitions only" mode (as described above with respect to FIG. 7B) and based on the user's browsing history.

As depicted in FIG. 11B, user interaction with at least one of the collaborative document node element 1103 or the document transition edge element 1122 can cause display of three second-degree document transition edge elements 1123-1125 that describe first-degree document transition edge objects of the third collaborative document node object that is associated with the collaborative document node element 1103, as well as the display of three second-degree collaborative document node elements 1104-1106 that describe first-degree collaborative document node objects that are connected to the third collaborative document node object via a first-degree document transition edge object. In other words, user interaction with at least one of the collaborative document node element 1103 or the document transition edge element 1122 can cause display of the single-root collaborative document graph-based user interface 1150 that depicts: (i) the document transition edge element 1123 that describes a first-degree document transition edge object associated with the third collaborative document node object and a collaborative document node object that is associated with the collaborative document node element 1104, (ii) the document transition edge element 1124 that describes a first-degree document transition edge object associated with the third collaborative document node object and a collaborative document node object that is associated with the collaborative document node element 1105, and (iii) the document transition edge element 1125 that describes a first-degree document transition edge object associated with the third collaborative document node object and a collaborative document node object that is associated with the collaborative document node element 1106.

Returning to FIG. 6, at operation 602, the client computing device 102 determines an edge-wise visual effect associated with a selected document transition edge element of the collaborative document graph-based user interface. The selected document transition edge element is defined between a first collaborative document node element of the collaborative document graph-based user interface and a second collaborative document node element of the collaborative document graph-based user interface, and the edge-wise visual effect is determined based on an edge-wise visual effect object received from the document collaboration server computing device 106, where the edge-wise visual effect object is determined based on a subset of the collaborative document user transition data that is associated with a first collaborative document node object corresponding to the first collaborative document node element and a second collaborative document node object corresponding to the second collaborative document node element.

An edge-wise visual effect is a visual element that is configured to be generated by the client computing device 102 and presented to an end-user of the client computing device 102 as a modification to a current visual state of a document transition edge element. The client computing device 102 is configured to generate the edge-wise visual effect based on an edge-wise visual effect object, wherein the edge-wise visual effect object is generated by the document collaboration server computing device 106 and transmitted by the document collaboration server computing device 106 to the client computing device 102. The edge-wise visual effect may, for example, change a coloring scheme of the corresponding document transition edge element and/or change a width intensity of the corresponding document transition edge element.

At operation 603, the client computing device 102 updates the collaborative document graph-based user interface to apply the edge-wise visual effect to the selected document transition edge element. An operational example of updating a collaborative document graph-based user interface is depicted in FIG. 8. As depicted in FIG. 8, the collaborative document graph-based user interface 700 of FIG. 7C is updated by increasing the width intensity of the document transition edge element 711 and the width intensity of the document transition edge element 722.

In some embodiments, to apply a positive edge-wise visual effect, the client computing device 102 may increase a width intensity of the selected document transition edge element. In some embodiments, to apply a positive edge-wise visual effect, the client computing device 102 may decrease a brightness measure of the selected document transition edge element. As yet another example, to apply a positive edge-wise visual effect, the client computing device 102 may increase a redness measure of the selected document transition edge element. In some embodiments, to apply a positive edge-wise visual effect, the client computing device 102 may increase a darkness measure of the selected document transition edge element.

In some embodiments, to apply a negative edge-wise visual effect, the client computing device 102 may decrease a width intensity of the selected document transition edge element. In some embodiments, to apply a negative edge-wise visual effect, the client computing device 102 may increase a brightness measure of the selected document transition edge element. In some embodiments, to apply a negative edge-wise visual effect, the client computing device 102 may increase a redness measure of the selected document transition edge element. As a further example, to apply a negative edge-wise visual effect, the client computing device 102 may decrease a darkness measure of the selected document transition edge element.

Exemplary Distributed Software Architectures

FIG. 9 is a distributed operational flow diagram of an example process 900 for dynamically updating a collaborative document graph-based user interface. In particular, the process 900 depicts operations performed by the document collaboration server computing device 106 of the document collaboration server system 101 in communication with the storage subsystem 108 of the document collaboration server system 101 and with the exemplary client computing device 102, as well as the operations performed by the client computing device 102 in communication with the document collaboration server computing device 106 and in interaction with the target end-user 951.

The process 900 begins at operation 901 when the document collaboration server computing device 106 retrieves collaborative document user transition data from the storage subsystem 108. The collaborative document user transition data describe a group of collaborative documents associated with the document collaboration server system 101 as well as a group of cross-document transitional relationships between the group of collaborative documents. The collaborative document user transition data is configured to describe one or more referential associations between a group of collaborative documents and/or one or more transitional associations between a group of collaborative documents. A referential association between two collaborative documents describes that a first collaborative document of the two collaborative documents includes a link/reference to a second collaborative document of the two collaborative documents. A transitional association between two collaborative documents describes that a particular user profile has selected to transition from a first collaborative document of the two collaborative documents to a second collaborative document of the two collaborative documents by selecting a link to the second collaborative document in the first collaborative document. In some embodiments, a transitional association between two collaborative documents is determined based on user activity data for a target user profile during a historical document viewing session. In some embodiments, a transitional association between two collaborative documents is determined based on document browsing timestamps for a target collaborative document.

At operation 902, the document collaboration server computing device 106 generates the collaborative document graph-based interface object based on the collaborative document user transition data. The collaborative document graph-based interface object describes the collaborative document nodes elements and the document transition edge elements associated with the corresponding collaborative document graph-based user interface. For example, a collaborative document graph-based interface object may describe the collaborative document nodes elements and the document transition elements associated with a corresponding collaborative document graph-based user interface using HTML, data.

At operation 903, the document collaboration server computing device 106 transmits the collaborative document graph-based interface object to a client computing device 102 to cause the client computing device 102 to present the collaborative document graph-based user interface based on the collaborative document graph-based interface object. For example, the document collaboration server computing device 106 may transmit the collaborative document graph-based interface object to the client computing device 102 as HTML data.

At operation 904, the client computing device 102 generates a collaborative document graph-based user interface. The collaborative document graph-based user interface depicts a plurality of collaborative document node elements that are visually connected, at least partly, by a plurality of document transition edge elements, wherein the plurality of document transition edge elements are configured to visually represent the collaborative document user transition data.

At operation 905, the client computing device 102 presents the collaborative document graph-based user interface to the target end-user 951. The client computing device 102 uses the input/output circuitry 306 to render an electronic display corresponding to the collaborative document graph-based user interface on a display device associated with the client computing device 102.

At operation 906, the document collaboration server computing device 106 queries the storage subsystem 108 to detect a change in the collaborative document user transition data for a selected document transition edge object. For example, the change may describe that the collaborative document user transition data no longer validates the selected document transition edge object, as a relationship property data field associated with the selected document transition edge object has fallen below a relevant threshold. As another example, the change may describe that, according to the collaborative document user transition data, a relationship property data field associated with the selected document transition edge object has increased or decreased.

At operation 907, the document collaboration server computing device 106 generates an edge-wise visual effect object based on the detected change. The edge-wise visual effect object describes a change in one or more relationship property data fields of a corresponding cross-document transitional relationship that is associated with a corresponding document transition edge object for the edge-wise visual effect object. For example, the document collaboration server computing device 106 may generate the edge-wise visual effect object based on a referential frequency measure for the two collaborative document node objects that are associated with the corresponding cross-document transitional relationship. As another example, the document collaboration server computing device 106 may generate the edge-wise visual effect object based on a transitional frequency measure for the two collaborative document node objects that are associated with the corresponding cross-document transitional relationship. As another example, the document collaboration server computing device 106 may generate the edge-wise visual effect object based on a transitional frequency measure for the two collaborative document node objects that are associated with the corresponding cross-document transitional relationship. As yet another example, the document collaboration server computing device may 106 generate the edge-wise visual effect object based on a transitional recency measure for the two collaborative document node objects that are associated with the corresponding cross-document transitional relationship.

At operation 908, the document collaboration server computing device 106 transmits the edge-wise visual effect object to the client computing device 102. For example, the document collaboration server computing device 106 may transmit the edge-wise visual effect object to the client computing device 102 as HTML data.

At operation 909, the document collaboration server computing device 106 generates an updated collaborative document graph-based user interface based on the edge-wise visual effect object. The client computing device 102 updates the collaborative document graph-based user interface to apply an edge-wise visual effect corresponding to the edge-wise visual effect object to the selected document transition edge element.

At operation 910, the client computing device 102 displays the updated collaborative document graph-based user interface to the target end-user 951. The client computing device 102 uses the input/output circuitry 306 to render an electronic display corresponding to the updated collaborative document graph-based user interface on a display device associated with the client computing device 102.

Additional Implementation Details

Although example processing systems have been described in the figures herein, implementations of the subject matter and the functional operations described herein can be implemented in other types of digital electronic circuitry, or in computer software, firmware, or hardware, including the structures disclosed in this specification and their structural equivalents, or in combinations of one or more of them.

Embodiments of the subject matter and the operations described herein can be implemented in digital electronic circuitry, or in computer software, firmware, or hardware, including the structures disclosed in this specification and their structural equivalents, or in combinations of one or more of them. Embodiments of the subject matter described herein can be implemented as one or more computer programs, i.e., one or more modules of computer program instructions, encoded on computer-readable storage medium for execution by, or to control the operation of, information/data processing apparatus. Alternatively, or in addition, the program instructions can be encoded on an artificially-generated propagated signal, e.g., a machine-generated electrical, optical, or electromagnetic signal, which is generated to encode information/data for transmission to suitable receiver apparatus for execution by an information/data processing apparatus. A computer-readable storage medium can be, or be included in, a computer-readable storage device, a computer-readable storage substrate, a random or serial access memory array or device, or a combination of one or more of them. Moreover, while a computer-readable storage medium is not a propagated signal, a computer-readable storage medium can be a source or destination of computer program instructions encoded in an artificially-generated propagated signal. The computer-readable storage medium can also be, or be included in, one or more separate physical components or media (e.g., multiple CDs, disks, or other storage devices).

The operations described herein can be implemented as operations performed by an information/data processing apparatus on information/data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (Application Specific Integrated Circuit). The apparatus can also include, in addition to hardware, code that creates an limited interaction mode and/or a non-limited interaction mode for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or information/data (e.g., one or more scripts stored in a markup language page), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described herein can be performed by one or more programmable processors executing one or more computer programs to perform actions by operating on input information/data and generating output. Processors suitable for the execution of a computer program include, by way of example, both general and special purpose microprocessors, and any one or more processors of any kind of digital computer. Generally, a processor will receive instructions and information/data from a read-only memory, a random access memory, or both. The essential elements of a computer are a processor for performing actions in accordance with instructions and one or more memory devices for storing instructions and data. Generally, a computer will also include, or be operatively coupled to receive information/data from or transfer information/data to, or both, one or more mass storage devices for storing data, e.g., magnetic, magneto-optical disks, or optical disks. However, a computer need not have such devices. Devices suitable for storing computer program instructions and information/data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described herein can be implemented on a computer having a display device, e.g., a CRT (cathode ray tube) or LCD (liquid crystal display) monitor, for displaying information/data to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending pages to and receiving pages from a device that is used by the user; for example, by sending web pages to a web browser on a user's query-initiating computing device in response to requests received from the web browser.

Embodiments of the subject matter described herein can be implemented in a computing system that includes a back-end component, e.g., as an information/data server, or that includes a middleware component, e.g., an application server, or that includes a front-end component, e.g., a query-initiating computing device having a graphical user interface or a web browser through which a user can interact with an implementation of the subject matter described herein, or any combination of one or more such back-end, middleware, or front-end components. The components of the system can be interconnected by any form or medium of digital information/data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits information/data (e.g., an HTML page) to a query-initiating computing device (e.g., for purposes of displaying information/data to and receiving user input from a user interacting with the query-initiating computing device). Information/data generated at the query-initiating computing device (e.g., a result of the user interaction) can be received from the query-initiating computing device at the server.

While this specification contains many specific implementation details, these should not be construed as limitations on the scope of any inventions or of what may be claimed, but rather as description of features specific to particular embodiments of particular inventions. Certain features that are described herein in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in incremental order, or that all illustrated operations be performed, to achieve desirable results, unless described otherwise. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or incremental order, to achieve desirable results, unless described otherwise. In certain implementations, multitasking and parallel processing may be advantageous.

CONCLUSION

Many modifications and other embodiments of the inventions set forth herein will come to mind to one skilled in the art to which these inventions pertain having the benefit of the teachings presented in the foregoing description and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation, unless described otherwise.

That which is claimed is:

1. An apparatus for dynamically updating a collaborative document graph-based user interface, the apparatus comprising a display, at least one processor, and at least one memory including program code, the at least one memory and the program code configured to, with the processor, cause the apparatus to at least:

present, via the display, the collaborative document graph-based user interface comprising a plurality of collaborative document node elements that are visually connected, at least partly, by a plurality of document transition edge elements, wherein the collaborative document graph-based user interface is configured to enable selection and display of a links only mode, and a transitions only mode, wherein the plurality of document transition edge elements are configured to visually represent collaborative document user transition data;

determine, via the processor, an edge-wise visual effect associated with a selected document transition edge element of the plurality of document transition edge elements, wherein the selected document transition edge element is defined between a first collaborative document node element of the plurality of collaborative document node elements and a second collaborative document node element of the plurality of collaborative document node elements, and wherein the edge-wise visual effect is determined based on a subset of the collaborative document user transition data that is associated with a first collaborative document node object corresponding to the first collaborative document node element and a second collaborative document node object corresponding to the second collaborative document node element, wherein the edge-wise visual effect is determined in the links only mode based at least in part on a referential frequency measure that comprises a count of unidirectional links from the first collaborative document node object to the second collaborative document node object, and wherein the edge-wise visual effect is further determined in the transitions only mode based at least in part on a transitional frequency measure that comprises a count of user transitions between the first collaborative document node object and the second collaborative document node object; and update the collaborative document graph-based user interface to apply the edge-wise visual effect to the selected document transition edge element.

2. The apparatus of claim 1, wherein the edge-wise visual effect is further determined based at least in part on a referential recency measure for the first collaborative document node object and the second collaborative document node object.

3. The apparatus of claim 1, wherein the edge-wise visual effect is determined based on a transitional recency measure for the first collaborative document node object and the second collaborative document node object.

4. The apparatus of claim 1, wherein updating the collaborative document graph-based user interface to apply the edge-wise visual effect to the selected document transition edge element comprises modifying a width intensity of the selected document transition edge element.

5. The apparatus of claim 1, wherein the plurality of document transition edge elements comprise one or more historical user transition edge elements that represent historical document transitions of a target user profile during a historical document viewing session.

6. The apparatus of claim 5, wherein the historical document transitions are generated based on user activity data for the target user profile during the historical document viewing session.

7. The apparatus of claim 5, wherein the historical document transitions are generated based on browsing timestamps for the plurality of collaborative document node objects during the historical document viewing session.

8. The apparatus of claim 1, wherein the collaborative document graph-based user interface is configured to enable selection and display of the plurality of document transition edge elements configured to visually represent user browsing history data, team browsing history data, or all employees browsing history data.

9. The apparatus of claim 1, wherein the collaborative document graph-based user interface is configured to update and expand to include new collaborative document node elements and new collaborative document transition edge elements based on user interaction with at least one of the plurality of collaborative document node elements or the plurality of document transition edge elements.

10. The apparatus of claim 1, wherein the collaborative document graph-based user interface is further configured to enable selection of a combined mode, wherein the edge-wise visual effect is determined in the combined mode based at least in part on the referential frequency measure and on the transitional frequency measure.

11. An apparatus for dynamically updating a collaborative document graph-based user interface, the apparatus comprising at least one processor and at least one memory including program code, the at least one memory and the program code configured to, with the processor, cause the apparatus to at least:

generate a collaborative document graph-based interface object that describes the collaborative document graph-based user interface, wherein the collaborative document graph-based user interface comprises a plurality of collaborative document node elements that are visually connected, at least partly, by a plurality of document transition edge elements, wherein the collaborative document graph-based user interface is configured to enable selection and display of a links only mode, and a transitions only mode, wherein the plurality of document transition edge elements are configured to visually represent collaborative document user transition data;

transmit the collaborative document graph-based interface object to a client computing device to cause the client computing device to present the collaborative document graph-based user interface based on the collaborative document graph-based interface object;

determine an edge-wise visual effect object associated with a selected document transition edge object that is associated with a selected document transition element of the plurality of document transition elements, wherein the selected document transition edge element is defined between a first collaborative document node element of the plurality of collaborative document node elements and a second collaborative document node element of the plurality of collaborative document node elements, and wherein the edge-wise visual effect object is determined based on a subset of the collaborative document user transition data that is associated with a first collaborative document node object corresponding to the first collaborative document node element and a second collaborative document node object corresponding to the second collaborative document node element, wherein the edge-wise visual effect is determined in the links only mode based at least in part on a referential frequency measure that comprises a count of unidirectional links from the first collaborative document node object to the second collaborative document node object, and wherein the edge-wise visual effect is further determined in the transitions only mode based at least in part on a transitional frequency measure that comprises a count of user transitions between the first collaborative document node object and the second collaborative document node object;

and transmit the edge-wise visual effect object to the client computing device, wherein the client computing device is configured to update the collaborative document graph-based user interface to apply an edge-wise visual effect corresponding to the edge-wise visual effect object to the selected document transition edge element.

12. The apparatus of claim 11, wherein the edge-wise visual effect is further determined at least in part based on a referential recency measure for the first collaborative document node object and the second collaborative document node object.

13. The apparatus of claim 11, wherein the edge-wise visual effect is further determined at least in part based on a transitional recency measure for the first collaborative document node object and the second collaborative document node object.

14. The apparatus of claim 11, wherein updating the collaborative document graph-based user interface to apply the edge-wise visual effect to the selected document transition edge comprises modifying a width intensity of the selected document transition edge element.

15. The apparatus of claim 11, wherein the plurality of document transition edge objects comprise one or more historical user transition edge objects that represent historical document transitions of a target user profile during a historical document viewing session.

16. The apparatus of claim 15, wherein the historical document transitions are generated based on user activity data for the target user profile during the historical document viewing session.

17. The apparatus of claim 15, wherein the historical document transitions are generated based on browsing timestamps for the plurality of collaborative document node objects during the historical document viewing session.

18. A computer-implemented method for dynamically updating a collaborative document graph-based user interface, the computer-implemented method comprising:

presenting, via a display, the collaborative document graph-based user interface comprising a plurality of collaborative document node elements that are visually connected, at least partly, by a plurality of document transition edge elements, wherein the collaborative document graph-based user interface is configured to enable selection and display of a links only mode, and a transitions only mode, wherein the plurality of document transition edge elements are configured to visually represent collaborative document user transition data;

determining, via a processor, an edge-wise visual effect associated with a selected document transition edge element of the plurality of document transition edge elements, wherein the selected document transition edge element is defined between a first collaborative document node element of the plurality of collaborative document node elements and a second collaborative document node element of the plurality of collaborative document node elements, and wherein the edge-wise visual effect is determined based on a subset of the collaborative document user transition data that is associated with a first collaborative document node object corresponding to the first collaborative document node element and a second collaborative document node object corresponding to the second collaborative document node element, wherein the edge-wise visual effect is determined in the links only mode based at least in part on a referential frequency measure that comprises a count of unidirectional links from the first collaborative document node object to the second collaborative document node object, and wherein the edge-wise visual effect is further determined in the transitions only mode based at least in part on a transitional frequency measure that comprises a count of user transitions between the first collaborative document node object and the second collaborative document node object; and updating the collaborative document graph-based user interface to apply the edge-wise visual effect to the selected document transition edge element.

19. A computer-implemented method for dynamically updating a collaborative document graph-based user interface, the computer-implemented method comprising:

generating a collaborative document graph-based interface object that describes the collaborative document graph-based user interface, wherein the collaborative document graph-based user interface comprises a plurality of collaborative document node elements that are visually connected, at least partly, by a plurality of document transition edge elements, wherein the collaborative document graph-based user interface is configured to enable selection and display of a links only mode, and a transitions only mode, wherein the plurality of document transition edge elements are configured to visually represent collaborative document user transition data;

transmitting the collaborative document graph-based interface object to a client computing device to cause the client computing device to present the collaborative document graph-based user interface based on the collaborative document graph-based interface object;

determining an edge-wise visual effect object associated with a selected document transition edge object that is associated with a selected document transition element of the plurality of document transition elements, wherein the selected document transition edge element is defined between a first collaborative document node element of the plurality of collaborative document node elements and a second collaborative document node element of the plurality of collaborative document node elements, and wherein the edge-wise visual effect object is determined based on a subset of the collaborative document user transition data that is associated with a first collaborative document node object corresponding to the first collaborative document node element and a second collaborative document node object corresponding to the second collaborative document node element, wherein the edge-wise visual effect is determined in the links only mode based at least in part on a referential frequency measure that comprises a count of unidirectional links from the first collaborative document node object to the second collaborative document node object, and wherein the edge-wise visual effect is further determined in the transitions only mode based at least in part on a transitional frequency measure that comprises a count of user transitions between the first collaborative document node object and the second collaborative document node object; and transmitting the edge-wise visual effect object to the client computing device, wherein the client computing device is configured to update the collaborative document graph-based user interface to apply an edge-wise visual effect corresponding to the edge-wise visual effect object to the selected document transition edge element.

* * * * *